US012675924B2

(12) United States Patent
Au et al.

(10) Patent No.: US 12,675,924 B2
(45) Date of Patent: Jul. 7, 2026

(54) GRAPH SET ANALYSIS AND VISUALIZATION FOR MACHINE LEARNING

(71) Applicant: Fujitsu Limited, Kawasaki (JP)

(72) Inventors: Wing Yee Au, Saratoga, CA (US); Kanji Uchino, Santa Clara, CA (US)

(73) Assignee: Fujitsu Limited, Kawasaki (JP)

( * ) Notice: Subject to any disclaimer, the term of this patent is extended or adjusted under 35 U.S.C. 154(b) by 284 days.

(21) Appl. No.: 18/194,607

(22) Filed: Mar. 31, 2023

(65) Prior Publication Data

US 2024/0331230 A1 Oct. 3, 2024

(51) Int. Cl.
G06T 11/26 (2026.01)
G06F 9/50 (2006.01)

(52) U.S. Cl.
CPC ............ G06T 11/26 (2026.01); G06F 9/5027 (2013.01)

(58) Field of Classification Search
CPC .... G06T 11/206; G06F 9/5027; G06F 9/5072; G06F 9/4881
See application file for complete search history.

(56) References Cited

U.S. PATENT DOCUMENTS 11,228,505 B1 * 1/2022 Wang ................... H04L 41/142
2007/0276636 A1 * 11/2007 Wythoff ................ G16C 20/80
703/2

2012/0189211 A1 * 7/2012 Luo ...................... G06F 16/583
382/218
2020/0334238 A1 * 10/2020 Sherman ............. G06F 16/2423
2022/0179910 A1 * 6/2022 Bharathy ................ G06N 3/08

(Continued)

FOREIGN PATENT DOCUMENTS

CN 101273604 A * 9/2008 .......... G06F 16/957
WO 2017/091774 A1 6/2017

(Continued)

OTHER PUBLICATIONS

Lamb, "System and method for progressive delivery of multimedia objects", Machine translation of CN-101273604A (Year: 2008).*

(Continued)

*Primary Examiner* — Kee M Tung
*Assistant Examiner* — Xiaoming Wei
(74) *Attorney, Agent, or Firm* — Fujitsu Intellectual Property Center; Tiep H. Nguyen

(57) ABSTRACT

In an embodiment, operations include receiving a graph dataset including a set of graphs. The operations further include generating, by a task scheduler, a set of task queues configured to process the received graph dataset in parallel. The operations further include determining, by the set of task queues, a set of graph attributes for each graph of the set of graphs. The operations further include receiving, by a web service, one or more graph attributes of the determined set of graph attributes. The operations further include transmitting, by the web service, attribute information including the received one or more graph attributes to a client browser. The client browser is configured to determine a set of graph views based on the transmitted attribute information. The operations further include controlling rendering of the determined set of graph views on the client browser.

19 Claims, 11 Drawing Sheets

(56)           References Cited

U.S. PATENT DOCUMENTS

2022/0413979 A1 * 12/2022 Sivasubramanian ........................
                                                  G06F 16/214
2023/0045347 A1 * 2/2023 Grady ...................... G06N 5/02

FOREIGN PATENT DOCUMENTS

WO        2019/241021 A9    12/2019
WO        2022/120585 A1     6/2022

OTHER PUBLICATIONS

Facets—Know Your Data, Google, (https://pair-code.github.io/facets/) and Gitlab repository 2017 (https://github.com/PAIR-code/facets).
Welcome to Tableau, Tableau Software, product brochure 2022.
Linkurious Enterprise user manual Version 3.0.11, Linkurious, online manual 2022 (https://doc.linkurio.us/user-manual/latest/).
Cytoscape, Cytoscape User Manual Release 3.7.0, The Cytoscape Consortium, product manual 2018.
Neo4j, "Neo4j Bloom, Browser & Desktop, online manuals 2022" (https://neo4j.com/docs/developer-tools/)
Peter Wills, et al., "Metrics for graph comparison: a practitioner's guide." Plos one 15.2 (2020): e0228728.
Nils M. Kriege, et al. "A Survey on Graph Kernels", arXiv preprint arXiv:1903.11835v2 (2020), 1-53.
NetworkX Reference Release 2.8, NetworkX, online manual 2022 (https://networkx.org/documentation/stable/reference/index.html).
Aric A. Hagberg, et al., "Exploring Network Structure, Dynamics, and Function using NetworkX", Proceedings of the 7th Python in Science Conference (SciPy 2008), pp. 11-16, http://conference.scipy.org/proceedings/SciPy2008/paper_2. [Note: See Network Reference Guide for any desired details].
Extended European Search Report dated May 10, 2024 for corresponding European Patent Application No. 24158270.9, 9 pages.

* cited by examiner

200

400

| Determine, for each graph of set of graphs, whether corresponding graph is continuous graph 402 |
| --- |

| Extract subgraph from each graph of set of graphs, based on determination that corresponding graph of set of graphs is continuous graph, for extraction of set of subgraphs, where set of task queues is generated based on extracted set of subgraphs 404 |
| --- |

| Determine whether first graph attribute, of set of graph attributes, is determined for each subgraph of extracted set of subgraphs and each discrete graph of set of graphs 406 |
| --- |

| Transmit, by first task queue of set of tasks queues, first notification, indicative of completion of determination of first graph attribute, to web service based on determination that first graph attribute is determined for each subgraph of extracted set of subgraphs and each discrete graph of set of graphs 408 |
| --- |

| Determine whether each graph attribute of set of graph attributes is determined for each subgraph of extracted set of subgraphs and each discrete graph of set of graphs 410 |
| --- |

| Transmit, by each task queue of set of tasks queues, second notification indicative of completion of determination of set of graph attributes to web service based on determination that each graph attribute of set of graph attributes is determined for each subgraph of extracted set of subgraphs and each discrete graph of set of graphs 412 |
| --- |

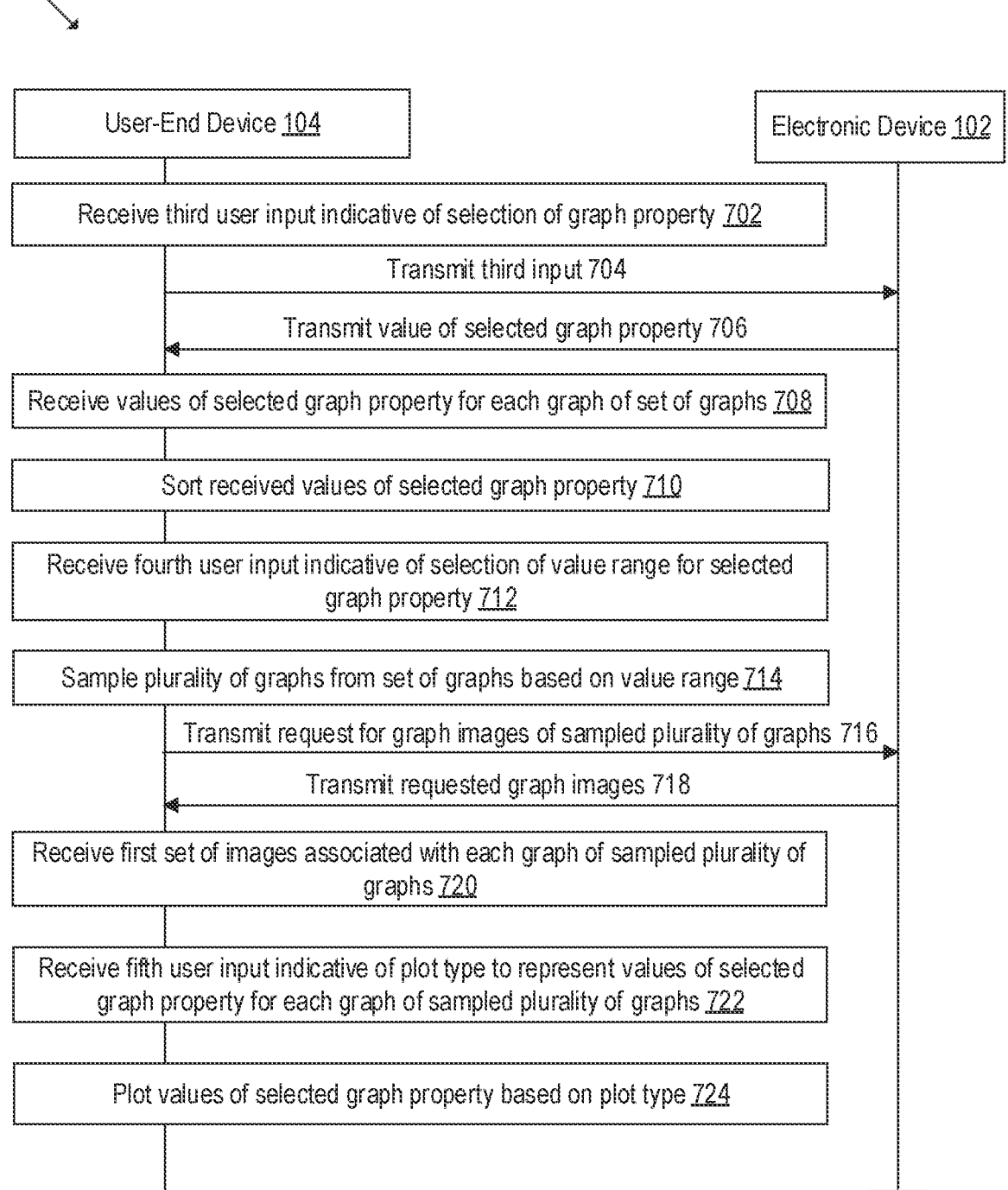

User-End Device 104　　　　　　　　　　Electronic Device 102

Receive third user input indicative of selection of graph property 702

Transmit third input 704

Transmit value of selected graph property 706

Receive values of selected graph property for each graph of set of graphs 708

Sort received values of selected graph property 710

Receive fourth user input indicative of selection of value range for selected graph property 712

Sample plurality of graphs from set of graphs based on value range 714

Transmit request for graph images of sampled plurality of graphs 716

Transmit requested graph images 718

Receive first set of images associated with each graph of sampled plurality of graphs 720

Receive fifth user input indicative of plot type to represent values of selected graph property for each graph of sampled plurality of graphs 722

Plot values of selected graph property based on plot type 724

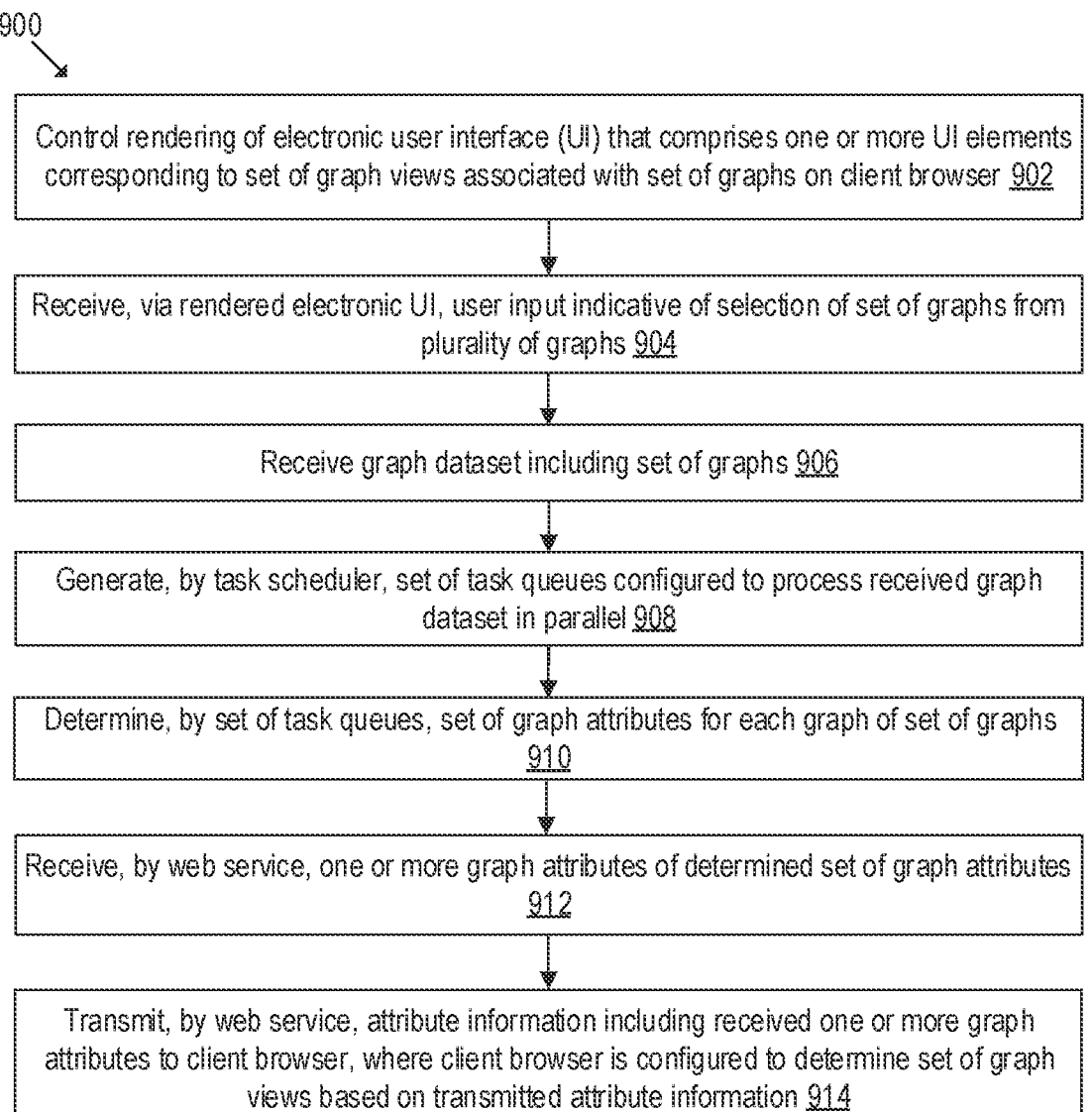

Control rendering of electronic user interface (UI) that comprises one or more UI elements corresponding to set of graph views associated with set of graphs on client browser 902

Receive, via rendered electronic UI, user input indicative of selection of set of graphs from plurality of graphs 904

Receive graph dataset including set of graphs 906

Generate, by task scheduler, set of task queues configured to process received graph dataset in parallel 908

Determine, by set of task queues, set of graph attributes for each graph of set of graphs 910

Receive, by web service, one or more graph attributes of determined set of graph attributes 912

Transmit, by web service, attribute information including received one or more graph attributes to client browser, where client browser is configured to determine set of graph views based on transmitted attribute information 914

*FIG. 9*

GRAPH SET ANALYSIS AND VISUALIZATION FOR MACHINE LEARNING

FIELD

The embodiments discussed in the present disclosure are related to graph set analysis and visualization for machine learning.

BACKGROUND

Advancements in graph machine learning requires improvement in graph data visualization, which has led to development of visualization techniques for a-priori determination of whether a graph dataset can be used for training a graph machine learning model. The visualization techniques may enable bridging a knowledge gap that may exist between graph datasets and graph machine learning. Typically, for determination of whether a graph dataset is worthwhile for graph machine learning, subgraphs may be extracted around specific nodes in graphs included in the graph dataset. Thereafter, the extracted subgraphs may be analyzed to determine variations amongst the extracted subgraphs. If the subgraphs are determined to be minutely different, (or largely similar, an accuracy of learning (or training) of the graph machine learning model is likely to be poor. Based on such analysis, it may be determined that the graph dataset may not be worthwhile for graph machine learning. On the other hand, based on the analysis of the extracted subgraphs, if it is determined that the extracted subgraphs are vastly different and, that, the differences are correlated to class label in supervised learning, the training accuracy may be high. This may render the graph machine learning model brittle for execution of actual machine learning tasks.

Further, since graph data is non-Euclidean, the analysis of the extracted subgraphs may indicate similarities or variations in the extracted subgraphs for specific properties of the graphs included in the graph dataset. Theoretically, graph machine learning may be used for identification of conflicting similarities and variations amongst the extracted subgraphs (and, thereafter, determine whether the graph dataset can be used for graph machine learning). However, such identification may require significant computational resources, especially for large subgraphs with many properties. Thus, determination of whether a graph dataset is to be used for graph machine learning (i.e., for training the graph machine learning model) based on large subgraphs (with large number of properties) may not be a feasible option.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include a set of operations, which may include receiving a graph dataset including a set of graphs. The set of operations may further include generating, by a task scheduler, a set of task queues configured to determine attributes in the set of graphs in parallel. The set of operations may further include determining, by the set of task queues, a set of graph attributes for each graph of the set of graphs. The set of operations may further include a web service accessing and receiving one or more graph attributes of the determined set of graph attributes, for each graph of the set of graphs. The set of operations may further include transmitting, by the web service, attribute information that may include the received one or more graph attributes to a client browser. The client browser may be configured to determine a set of graph views based on the transmitted attribute information. The set of operations may further include controlling rendering of the determined set of graph views on the client browser.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which:

FIG. 4 is a diagram that illustrates a flowchart of an example method for determination of a set of graph attributes for each graph of a set of graphs;

FIG. 7 is a diagram that illustrates exemplary operations for control of rendering of a graph set view on a client browser;

FIG. 9 is a diagram that illustrates a flowchart of an example method for graph set analysis and visualization of graph set views for graph machine learning; all according to at least one embodiment described in the present disclosure.

DESCRIPTION OF EMBODIMENTS

Figure 1:
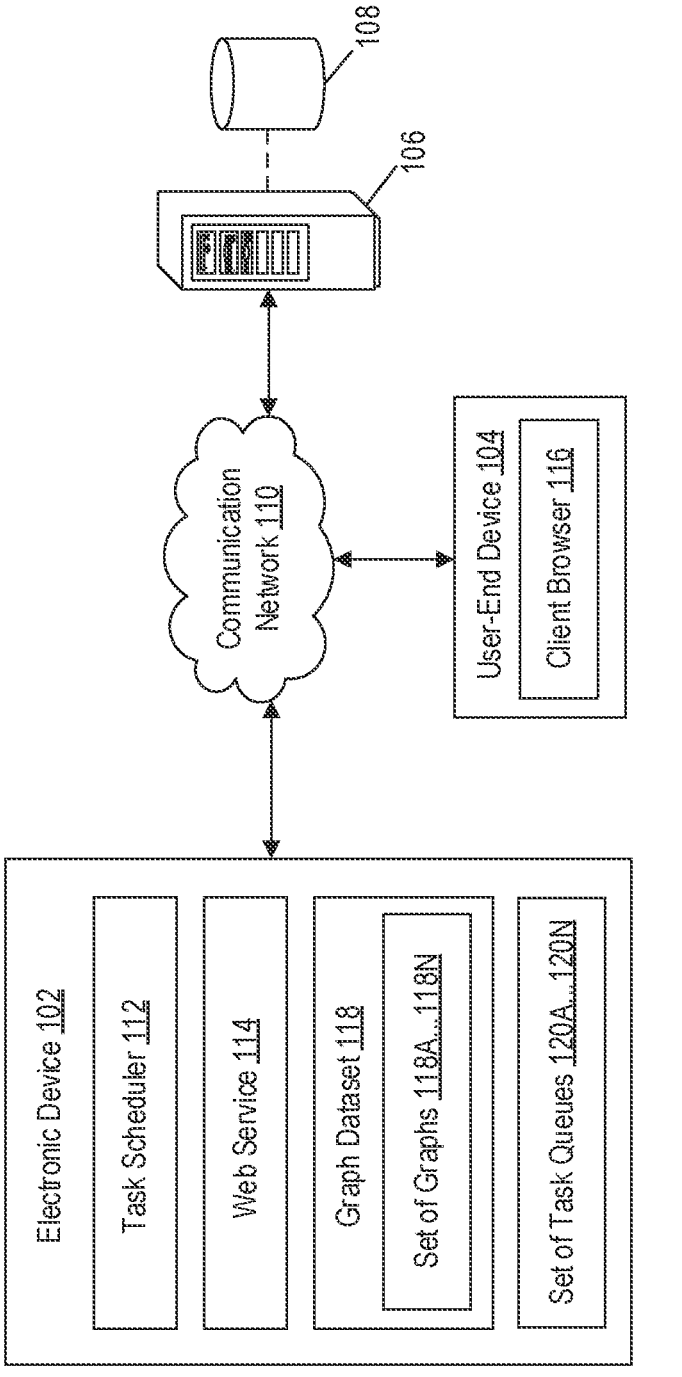
FIG. 1 is a diagram representing an example network environment related to graph set analysis and visualization for machine learning.

Some embodiments described in the present disclosure relate to methods and systems for graph set analysis and visualization for machine learning. Herein, the graph set analysis may involve reception of a graph dataset including a set of graphs. A set of graph attributes may be determined for each graph of the set of graphs. Further, one or more graph attributes of the determined set of graph attributes may be transmitted to a web service. Further, attribute information including the received one or more graph attributes may be transmitted, by the web service, to a client browser on a user-end device. The client browser may be configured to determine a set of graph views based on the transmitted attribute information. Finally, rendering of the determined set of graph views may be controlled on the client browser.

A graph machine learning workflow may involve extraction of graph data as subgraphs. The subgraphs may be extracted from a graph database based on queries and labelling. Some of the extracted subgraphs and labels may be used to train a predictive model to perform graph machine learning, while other extracted subgraphs may be provided as input to a predictive model for generation of predictions. However, a knowledge gap (i.e., insufficient knowledge) associated with the extracted subgraphs and labels may lead to a loss in accuracy of results that may be obtained using the predictive model. Further, the knowledge gap may lead to a generation of inconclusive or inaccurate explanations for the generated results. For minimization of the knowledge gap, an analysis of the extracted subgraphs may be performed. Such an analysis may enable an end-user to determine whether the extracted subgraphs and labels may be usable for graph machine learning. For example, the analysis may indicate whether the extracted subgraphs are similar to each other. If the extracted subgraphs are similar, then usage of the extracted subgraphs for training the predictive model may reduce the training accuracy of the predictive model. The analysis may further indicate whether the extracted subgraphs have marginal or significant variations amongst each other, or whether the variations are correlated to a class label in supervised learning. Based on such analysis, it may be determined that usage of the extracted subgraphs, for training the predictive model, may render the predictive model too brittle for actual use (for graph machine learning). The basis of the similarities or variations between the extracted subgraphs may be various properties of the extracted subgraphs. The determination of the properties and the preparation (i.e., training) of the predictive model based on the extracted subgraphs, especially those with a large size and multiple properties, may require significant computational resources and involve significant latency.

The suitability of graph data to be used as training data, for generation of an accurate graph machine learning model or reduction of the knowledge gap, may also be determined based on a distribution of feature values of the graph data and a relationship between the feature values. The distribution of the feature values and the associated relationship between the feature values may enable visualization of the graph data and a-priori determination of whether the graph data is suitable for training the predictive model. The a-priori determination may be based on determination of optimal features in the graph data and selection of the determined optimal features. However, the determination of the distribution of the feature values and the associated relationship between the feature values may be a cumbersome process for voluminous graph data.

According to one or more embodiments of the present disclosure, the technological field of graph machine learning may be improved by configuring a computing system (for example, an electronic device) in a manner that the computing system may provide a framework for visualization and collective analysis of a set of graphs. The framework may enable a stepwise exploration and analysis on a global distribution (corresponding to the set of graphs) and determination of relationship amongst numerous graph attributes (associated with each graph of the set of graphs) in a flexible, intuitive, and interactive manner. The computing system may include a task scheduler which may parallelize computation of a set of graph attributes for each graph of a set of graphs. The parallelization may be achieved using task queues. The parallelization may speed-up the computation of the set of graph attributes.

Each task queue may determine a graph attribute of the set of graph attributes for each graph of the set of graphs. The set of graph attributes, determined for each graph of the set of graphs, may be saved and stored in a database. Thereafter, the task queues may transmit one or more graph attributes of the set of graph attributes to a web service controlled by the computing system. Alternatively, the web service may retrieve the one or more graph attributes from the database. The one or more graph attributes may be selected from the set of graph attributes based on a filtering of the set of graphs by use of a data label and a filter. The web service may transmit attribute information that may include the received one or more graph attributes (which may be determined by the task queues) to a client browser that may be included in a user-end device. The data label and the filter may collectively enable the web service to partially transmit attribute information (i.e., the one or more graph attributes filtered from the set of graph attributes) to the client browser for enhanced visualization on the client browser.

The client browser may determine a set of graph views based on attribute information, which may be received from the computing system. The set of graph views may correspond to the enhanced visualization rendered on the client browser. The computing system may control rendering of the set of graph views (i.e., the enhanced visualization) on the client browser. The set of graph views include a one-dimensional graph view, a two-dimensional graph view, a graph set view, or a single graph view. The one-dimensional graph view may indicate a variation of a selected graph attribute for each graph of the set of graphs. The two-dimensional graph view may indicate a correlation between two graph attributes of the set of graph attributes for each graph of the set of graphs. The graph set view may indicate a set of graphs for which a value of a selected graph attribute falls with a selected range. The single graph view may indicate the set of graph attributes for a selected graph of the set of graphs.

The computing system may enable an end-user to interact (via the client browser) with the determined set of graph views to explore and gain insight into the set of graphs. The computing system may control the rendering of the graph set views based on a received selection of an arbitrary number and combinations of graph attributes of the set of graph attributes. Further, each graph view of the set of graph views may be related to other graph views. Therefore, the rendering of the set of graph views may be controlled such that a stepwise and interactive exploration of the set of graphs may be facilitated, based on the determined graph attributes. For example, the computing system may enable a stepwise exploration starting from a global analysis using the one-dimensional graph view to a single graph analysis using the single graph view. Insights obtained from the exploration may reduce the knowledge gap existing between graph data (which may be used to train or prepare the predictive model) and graph machine learning. Overcoming the knowledge gap may allow end-users (such as data scientists) to a-priori access the suitability of the graph data and labels for graph machine learning, reduce latency that may be involved in training a predictive model, and computational resource requirement for training the predictive model. Based on the graph set views (i.e., the enhanced visualization), it may be determined whether the set of graphs may be used for graph machine learning.

Embodiments of the present disclosure are explained with reference to the accompanying drawings.

FIG. 1 is a diagram representing an example network environment related to graph set analysis and visualization for machine learning, according to at least one embodiment described in the present disclosure. With reference to FIG. 1, there is shown a network environment 100. The network environment 100 may include an electronic device 102, a user-end device 104, and a server 106 (that may host a database 108). The electronic device 102, the user-end device 104, and the server 106 may be communicatively coupled to one another, via a communication network (such as the communication network 110). The electronic device 102 may include a task scheduler 112 and a web service 114. The user-end device 104 may include a client browser 116.

The electronic device 102 may include suitable logic, circuitry, interfaces, and/or code that may be configured to receive a graph dataset 118 including a set of graphs 118A . . . 118N. In an embodiment, the graph dataset 118 may be stored on the electronic device 102. In certain embodiments, the graph dataset 118 may be stored on the database 108. Further, the electronic device 102 may generate, by use of the task scheduler 112, a set of task queues 120A . . . 120N that may be configured to process the received graph dataset 118 in parallel. The electronic device 102 may determine, by use of the set of task queues 120A . . . 120N, a set of graph attributes for each graph of the set of graphs 118A . . . 118N. Further, the electronic device 102 may receive, by the web service 114, one or more graph attributes of the determined set of graph attributes. Further, the electronic device 102 may transmit, by the web service 114, attribute information that may include the received one or more graph attributes to the client browser 116. Thereafter, based on the transmitted attribute information, the electronic device 102 may control rendering of a set of graph views (which may be determined by the client browser 116) on the client browser 116. Examples of the electronic device 102 may include, but may not be limited to, a computing device, a smartphone, a mainframe machine, a server, a consumer electronic (CE) device, a computer workstation, and/or a device with a graph-processing capability (such as, a device with a set of graphic processor units (GPU)).

The user-end device 104 may include suitable logic, circuitry, interfaces, and/or code that may be configured to receive control instructions from the electronic device 102. The user-end device 104 may determine, based on the attribute information transmitted by the electronic device 102, a set of graph views. Thereafter, based on the received control instructions, the user-end device 104 may render the determined set of graph views on the client browser 116. The set of graph views may be rendered on an electronic user interface (UI) that comprises one or more UI elements. The set of graph views may correspond to the one or more UI elements. The user-end device 104 may be further configured to receive, via the electronic UI, a user input indicative of a selection of the set of graphs (for example, the set of graphs 118A . . . 118N) from a plurality of graphs. The user-end device 104 may further receive, via the electronic UI, a selection of the one or more graph attributes for determination of the set of graph views, or a selection of one or more graphs of the set of graphs 118A . . . 118N based on values of a selected graph attribute associated with the one or more graphs. In FIG. 1, the electronic device 102 and the user-end device 104 are shown as two separate devices merely as an example. In some embodiments, the entire functionality of the user-end device 104 may be incorporated in the electronic device 102, without a deviation from the scope of the disclosure. Examples of the user-end device 104 may include, but may not be limited to, a computing device, a tablet, a smartphone, a smart wearable device, a gaming console, a virtual reality (VR) device, an augmented reality (AR) device, a mixed reality (MR) device, a mainframe machine, a computer workstation, an internet of things (IoT) device, and/or any consumer electronic (CE) device.

The server 106 may include suitable logic, circuitry, and interfaces, and/or code that may be configured to receive requests from the electronic device 102 for the graph dataset 118. The server 106 may be further configured to retrieve the graph dataset 118 from the database 108 and transmit the graph dataset 118 to the electronic device 102. In at least one embodiment, the server 106 may receive a request for data labels from the electronic device 102 for filtering of the set of graph attributes and may transmit the data labels to the electronic device 102. In some embodiments, the server 106 may be configured to receive the graph dataset 118 from the electronic device 102 and determine a set of graph attributes for each graph of the set of graphs 118A . . . 118N. Thereafter, the server 106 may transmit the determined set of graph attributes to the electronic device 102. The server 106 may be implemented as a cloud server and may execute operations through web applications, cloud applications, hypertext transport protocol (HTTP) requests, repository operations, file transfer, and the like. Other example implementations of the server 106 may include, but are not limited to, a database server, a file server, a web server, a media server, an application server, a mainframe server, a cloud computing server, and/or any device with a graph-processing capability (such as, a device with a set of graphic processor units (GPU)).

In at least one embodiment, the server 106 may be implemented as a plurality of distributed cloud-based resources by use of several technologies that may be well known to those ordinarily skilled in the art. A person with ordinary skill in the art will understand that the scope of the disclosure may not be limited to the implementation of the server 106 and the electronic device 102 as two separate entities. In certain embodiments, the functionalities of the server 106 can be incorporated in its entirety or at least partially in the electronic device 102, without a departure from the scope of the disclosure.

The database 108 may include suitable logic, circuitry, interfaces, and/or code that may be configured to store the graph dataset 118 (i.e., the set of graphs 118A . . . 118N) representative of various domains (such as, a social network-domain dataset, a molecular chemistry-domain dataset, a genetic sequence-domain dataset, an ecommerce-domain dataset, or a financial-domain dataset). The database 108 may be derived from data off a relational or non-relational database, or a set of comma-separated values (csv) files in a conventional storage or a big-data storage. The database 108 may be stored or cached on a device, such as, the server 106 or the electronic device 102. The device storing the database 108 may be configured to receive a query for the graph dataset 118. In response, the device storing the database 108 may be configured to retrieve and transmit the graph dataset 118 to the electronic device 102. In accordance with an embodiment, the database 108 may be hosted on a plurality of servers stored at same or different locations. The operations of the database 108 may be executed using hardware including a processor, a microprocessor (for example, to perform or control performance of one or more operations), a field-programmable gate array (FPGA), or an application-specific integrated circuit (ASIC). In some other instances, the database 108 may be implemented using software.

The communication network 110 may include a communication medium via which the electronic device 102, the server 106, and the database 108 may communicate with each other. The communication network 110 may be one of a wired connection or a wireless connection. Examples of the communication network 110 may include, but are not limited to, the Internet, a cloud network, a Cellular or Wireless Mobile Network (such as, Long-Term Evolution and 5G New Radio), a satellite network (such as, a network of a set of low-earth orbit satellites), a Wireless Fidelity (Wi-Fi) network, a Personal Area Network (PAN), a Local Area Network (LAN), or a Metropolitan Area Network (MAN). Various devices in the network environment 100 may be configured to connect to the communication network 110 in accordance with various wired and wireless communication protocols. Examples of the wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The task scheduler 112 may include suitable logic, circuitry, interfaces, and/or code that may be configured to schedule a set of tasks corresponding to determination of the set of graph attributes for each graph of the set of graphs 118A . . . 118N. The task scheduler 112 may retrieve the received set of graphs 118A . . . 118N and analyze each graph of the set of graphs 118A . . . 118N for identification of one or more graph attributes to be determined in a corresponding graph. The task scheduler 112 may consolidate the identified one or more graph attributes for each graph of the set of graphs 118A . . . 118N to identify the set of graph attributes to be determined for the set of graphs 118A . . . 118N. The task scheduler 112 may further schedule a task of the set of tasks (i.e., determination of a graph attribute of the set of graph attributes), for each graph of the set of graphs 118A . . . 118N, to each task queue of the set of task queues 120A . . . 120N.

The web service 114 may include suitable logic, circuitry, interfaces, and/or code that may be configured to receive one or more graph attributes that may be filtered from the determined set of graph attributes. The web service 114 may further transmit the one or more graph attributes to the client browser 116. The web service 114 may facilitate rendering of a visualization of the set of graph attributes, for each graph of the set of graphs 118A . . . 118N, on the client browser 116. The web service 114 may further receive notifications from the set of task queues 120A . . . 120N about status or completion of execution of tasks (i.e., determination or updating of graph attributes). Based on the received notifications, the web service 114 may facilitate the client browser 116 to render partial results (i.e., the one or more graph attributes of the set of graph attributes) on an electronic UI in the user-end device 104. The partial results may correspond to graph set views of the set of graph views indicative of selected graph attributes of the set of graph attributes for one or more graphs of the set of graphs 118A . . . 118N.

The client browser 116 may include suitable logic, circuitry, interfaces, and/or code that may be configured to receive graph attributes of the identified set of graph attributes from the web service 114 of the electronic device 102. The client browser 116 may receive the identified set of graph attributes in stages. At each stage, one or more graph attributes of the set of graph attributes, determined by one or more task queues of the set of task queues 120A . . . 120N, may be received. The client browser 116 may generate the set of graph views based on the received one or more graph attributes. The client browser 116 may modify the generated set of graph views based on reception of other graph attributes of the identified set of graph attributes, as and when the graph attributes are determined at the end of the electronic device 102. The client browser 116 may receive control instructions associated with rendering of the generated set of graph views, and based on the control instructions, render the generated set of graph views as UI elements on a display screen of the user-end device 104. The client browser 116 may receive user inputs indicative of selection of a graph set view of the set of graph views, a graph attribute of the set of graph views for which a graph set view is to be generated, or a range of values associated with a selected graph attribute for one or more graphs of the set of graphs 118A . . . 118N.

In operation, the electronic device 102 may be configured to receive a graph dataset 118 that may include a set of graphs 118A . . . 118N. Each graph of the set of graphs 118A . . . 118N in the graph dataset 118 may be representative of a domain dataset (for example, a genome sequence-domain dataset, an ecommerce-domain dataset, or a social network-domain dataset). In some embodiments, the graph dataset 118 may be received from the server 106 or the database 108 (via the server 106). Each graph of the set of graphs 118A . . . 118N may possess multiple attributes based on graph elements (for example, node features, edges features, or graph structures) in a corresponding graph. Details of reception of the graph dataset are further provided, for example, in FIG. 3.

The electronic device 102 may be further configured to generate, by the task scheduler 112, the set of task queues 120A . . . 120N. The set of task queues 120A . . . 120N may be configured to process the received graph dataset 118 in parallel. The processing of the received graph dataset 118 may include determination of a set of graph attributes. The set of graph attributes may be determined in parallel using the set of task queues 120A . . . 120N. For generation of the set of task queues 120A . . . 120N, the task scheduler 112 may identify graph attributes to be determined for each graph of the set of graphs 118A . . . 118N. For example, the task scheduler 112 may identify that seven attributes may be required to be determined for each graph of the set of graphs 118A . . . 118N. Based on such an identification, the task scheduler 112 may generate seven task queues. Details of generation of the set of task queues are further provided, for example, in FIG. 3.

The electronic device 102 may be further configured to determine, by the set of task queues 120A . . . 120N, the set of graph attributes for each graph of the set of graphs 118A . . . 118N. Each task queue of the set of task queues 120A . . . 120N may be configured to determine a graph attribute of the set of graph attributes for each graph of the set of graphs 118A . . . 118N. For example, the electronic device 102 may determine that the set of graph attributes includes "N" graph attributes. Herein, the electronic device 102 may use the task scheduler 112 to identify the "N" graph attributes that may be required to be determined for each graph of the set of graphs 118A . . . 118N. Consequently, the electronic device 102 may be configured to generate "N" task queues (i.e., the set of task queues 120A . . . 120N may include "N" task queues) and each generated task queue may be configured to determine a graph attribute of the set of graph attributes. In at least one embodiment, the determined set of graph attributes may correspond to a set of graph properties, a set of graph features, or a set of graph structure plots. Details of determination of the set of graph attributes are further provided, for example, in FIG. 3, FIG. 4, FIG. 5, FIG. 6A, FIG. 6B, FIG. 6C, FIG. 7, and FIG. 8.

The electronic device 102 may be further configured to receive by the web service 114, one or more graph attributes of the determined set of graph attributes. The transmission of the one or more graph attributes may be based on a determination that a predefined number of graph attributes of the set of graph attributes have been determined. Each task queue of the set of task queues 120A . . . 120N may notify the web service 114 about the determination of a graph attribute of the set of graph attributes. The web service 114 may determine, based on reception of notifications from the set of task queues 120A . . . 120N, whether the predefined number of graph attributes of the identified set of graph attributes have between determined. If a predefined number of notifications (indicative of completion of determination of graph attributes) are received from a predefined number of task queues of the set of task queues 120A . . . 120N, the web service 114 may determine that the predefined number of graph attributes have been determined. Thereafter, the web service 114 may indicate that the predefined number of graph attributes have been determined. The web service 114 may receive the one or more graph attributes of the determined set of graph attributes based on the indication. The electronic device 102 may further update a status of an application programming interface (API) between the web service 114 and the client browser 116, based on the determination that the predefined number of graph attributes have been determined by the predefined number of task queues. Details of transmission of the one or more graph attributes are further provided, for example, in FIG. 3, FIG. 4, FIG. 5, FIG. 6A, FIG. 6B, FIG. 6C, FIG. 7, and FIG. 8.

The electronic device 102 may be further configured to transmit, by the web service 114, attribute information that may include the received one or more graph attributes to the client browser 116. Prior to the transmission of the attribute information, the web service 114 may transmit an indication, to the client browser 116, that the client browser 116 may transmit queries for reception of values of one or more graph attributes that have been determined for each graph of the set of graphs 118A . . . 118N. The web service 114 may transmit the indication based on the status of the API between the web service 114 and the client browser 116. On reception of the indications, the client browser 116 may transmit queries to the electronic device 102 for reception of values of the determined one or more graph attributes. The web service 114 may transmit the attribute information including the one or more graph attributes to the client browser 116 based on reception of the queries.

The client browser 116 may be configured to determine a set of graph views based on the transmitted attribute information. The set of graph views may include a one-dimensional graph view, a two-dimensional graph view, a graph set view, or a single graph view. The set of graph views may indicate values of graph attributes of the set of graph attributes that may be determined for each graph of the set of graphs 118A . . . 118N. The web service 114 may enable the client browser 116 to determine (or build) the set of graph views based on a set of user inputs indicative of selection of specific graph attributes or selection of a specific range of values of selected graph attributes. Details of transmission of the attribute information are further provided, for example, in FIG. 3, FIG. 5, FIG. 6A, FIG. 6B, FIG. 6C, FIG. 7, and FIG. 8.

The electronic device 102 may be further configured to control rendering of the determined set of graph views on the client browser 116. The rendering of the set of graph views may be controlled based on reception of user inputs indicative of selection of graph attributes (of the set of graph attributes which may be determined by the use of the set of task queues 120A . . . 120N) and sorting techniques to be used for plotting values of the selected graph attributes for the determination of the set of graph views. Based on the reception of the user inputs, the electronic device 102 may transmit the attribute information to the user-end device 104. The client browser 116 may determine the set of graph views based on the attribute information and render the determined set of graph views on an electronic UI based on the user inputs. Details of controlling of the rendering of the determined set of graph views are further provided, for example, in FIG. 3, FIG. 5, FIG. 6A, FIG. 6B, FIG. 6C, FIG. 7, and FIG. 8.

Modifications, additions, or omissions may be made to FIG. 1 without departing from the scope of the disclosure. For example, the network environment 100 may include more or fewer elements than those illustrated and described in the present disclosure. In some embodiments, the functionality of each of the user-end device 104, the server 106, and the database 108, may be incorporated into the electronic device 102, without a deviation from the scope of the disclosure.

Figure 2:
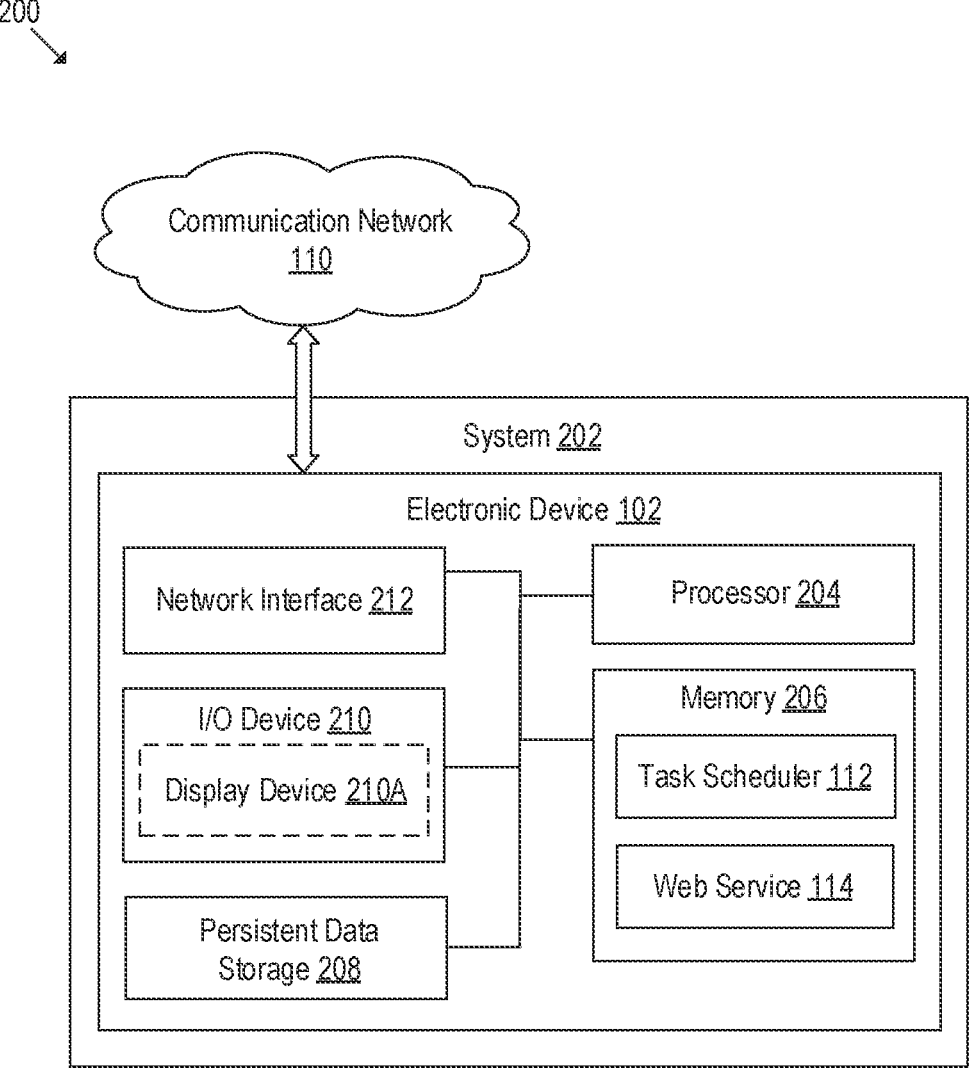
FIG. 2 is a block diagram that illustrates an exemplary electronic device for graph set analysis and visualization for machine learning.

FIG. 2 is a block diagram that illustrates an exemplary electronic device for graph set analysis and visualization for machine learning, in accordance with at least one embodiment described in the present disclosure. FIG. 2 is explained in conjunction with elements from FIG. 1. With reference to FIG. 2, there is shown a block diagram 200 of a system 202 that includes the electronic device 102. The electronic device 102 may include a processor 204, a memory 206, a persistent data storage 208, an input/output (I/O) device 210, and a network interface 212. In at least one embodiment, the memory 206 may store the task scheduler 112 and the web service 114. In at least one embodiment, the I/O device 210 may include a display device 210A.

The processor 204 may include suitable logic, circuitry, and interfaces that may be configured to execute a set of instructions stored in the memory 206. The processor 204 may be configured to execute program instructions associated with different operations to be executed by the electronic device 102. The processor 204 may be configured to receive the graph dataset 118 including the set of graphs 118A . . . 118N. The processor 204 may be further configured to generate, by the task scheduler 112, the set of task queues 120A . . . 120N that may be configured to process the received graph dataset 118 in parallel. The processor 204 may be further configured to determine, by the set of task queues 120A . . . 120N, a set of graph attributes for each graph of the set of graphs 118A . . . 118N. The processor 204 may be further configured to receive, by the web service 114 one or more graph attributes of the determined set of graph attributes. The processor 204 may be further configured to transmit, by the web service 114, attribute information including the received one or more graph attributes to the client browser 116. The processor 204 may be further configured to control rendering of a set of graph views, which may be determined based on the transmitted attribute information, on the client browser 116. The processor 204 may be implemented based on a number of processor technologies known in the art. Examples of the processor technologies may include, but are not limited to, a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), a co-processor, or a combination thereof.

Although illustrated as a single processor in FIG. 2, the processor 204 may include any number of processors configured to, individually or collectively, perform or direct performance of any number of operations of the electronic device 102, as described in the present disclosure. Additionally, one or more of the processors may be present on one or more different electronic devices, such as different servers. In at least one embodiment, the processor 204 may be configured to interpret and/or execute program instructions, or process data that may be stored in the memory 206 or the persistent data storage 208. In some embodiments, the processor 204 be configured to may fetch program instructions from the persistent data storage 208 and load the program instructions in the memory 206. After the program instructions are loaded into the memory 206, the processor 204 may execute the program instructions.

The memory 206 may include suitable logic, circuitry, and interfaces that may be configured to store the one or more instructions to be executed by the processor 204. The one or more instructions stored in the memory 206 may be executed by the processor 204 to perform the different operations of the processor 204 (and the electronic device 102). The memory 206 that may store the received graph dataset 118, the set of task queues 120A . . . 120N, and the determined set of graph attributes. Examples of implementation of the memory 206 may include, but are not limited to, a CPU cache, a Hard Disk Drive (HDD), a Solid-State Drive (SSD), Random Access Memory (RAM), Read Only Memory (ROM), Electrically Erasable Programmable Read-Only Memory (EEPROM), and/or a Secure Digital (SD) card.

The persistent data storage 208 may include suitable logic, circuitry, and/or interfaces that may be configured to store program instructions executable by the processor 204. The persistent data storage 208 may include computer-readable storage media for carrying or having computer-executable instructions or data structures stored thereon. Such computer-readable storage media may include any available media that may be accessed by a general-purpose or special-purpose computer, such as the processor 204. By way of example, and not limitation, such computer-readable storage media may include tangible or non-transitory computer-readable storage media including Compact Disc Read-Only Memory (CD-ROM) or other optical disk storage, magnetic disk storage or other magnetic storage devices (e.g., Hard-Disk Drive (HDD)), flash memory devices (e.g., Solid State Drive (SSD), Secure Digital (SD) card, other solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 204 to perform a certain operation or group of operations associated with the electronic device 102.

The I/O device 210 may include suitable logic, circuitry, and interfaces that may be configured to receive inputs and render outputs based on the received inputs. For example, the I/O device 210 may receive an input that may trigger reception of the graph dataset 118. The I/O device 210 may further receive a user input indicative of a selection of graph attributes of the set of graph attributes determined for each graph of the set of graphs 118A . . . 118N, a user input indicative of selection of a range of values associated with a selected graph attribute for a subset of graphs of the set of graphs 118A . . . 118N, a user input indicative of selection of a graph of the set of graphs 118A . . . 118N for determination of a single graph view, or a user input indicative of selection of a sorting technique to be used for sorting values of graph attributes of the set of graph attributes for determination of a set of graph views. Further, the I/O device 210 may render outputs such as graph views of the set of graph views. The I/O device 210 which may include various input and output devices, may be configured to communicate with the processor 204. Examples of the I/O device 210 may include, but are not limited to, a touch screen, a keyboard, a mouse, a joystick, a display device (e.g., the display device 210A), a microphone, and a speaker.

The display device 210A may include suitable logic, circuitry, and interfaces that may be configured to render the determined set of graph views. The display device 210A may be a touch screen which may enable a user to provide a user-input via the display device 210A. The touch screen may be at least one of a resistive touch screen, a capacitive touch screen, or a thermal touch screen. The display device 210A may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 210A may refer to a display screen of a head mounted device (HMD), a smart-glass device, a see-through display, a projection-based display, an electro-chromic display, or a transparent display.

The network interface 212 may include suitable logic, circuitry, and interfaces that may be configured to facilitate communication between the processor 204 (i.e., the electronic device 102), the user-end device 104, and the server 106, via the communication network 110. The network interface 212 may be implemented by use of various known technologies to support wired or wireless communication of the electronic device 102 with the communication network 110. The network interface 212 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 212 may be configured to communicate via wireless communication with networks, such as the Internet, an Intranet, or a wireless network, such as a cellular telephone network, a wireless local area network (LAN), and a metropolitan area network (MAN). The wireless communication may be configured to use one or more of a plurality of communication standards, protocols and technologies, such as Enhanced Data GSM Environment (EDGE), wideband code division multiple access (W-CDMA), Long Term Evolution (LTE), 5th Generation (5G) New Radio (NR), Global System for Mobile Communications (GSM), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VOIP), light fidelity (Li-Fi), Worldwide Interoperability for Microwave Access (Wi-MAX), a protocol for email, instant messaging, and a Short Message Service (SMS).

Modifications, additions, or omissions may be made to the example electronic device 102 without departing from the scope of the present disclosure. For example, in some embodiments, the example electronic device 102 may include any number of other components that may not be explicitly illustrated or described for the sake of brevity.

Figure 3:
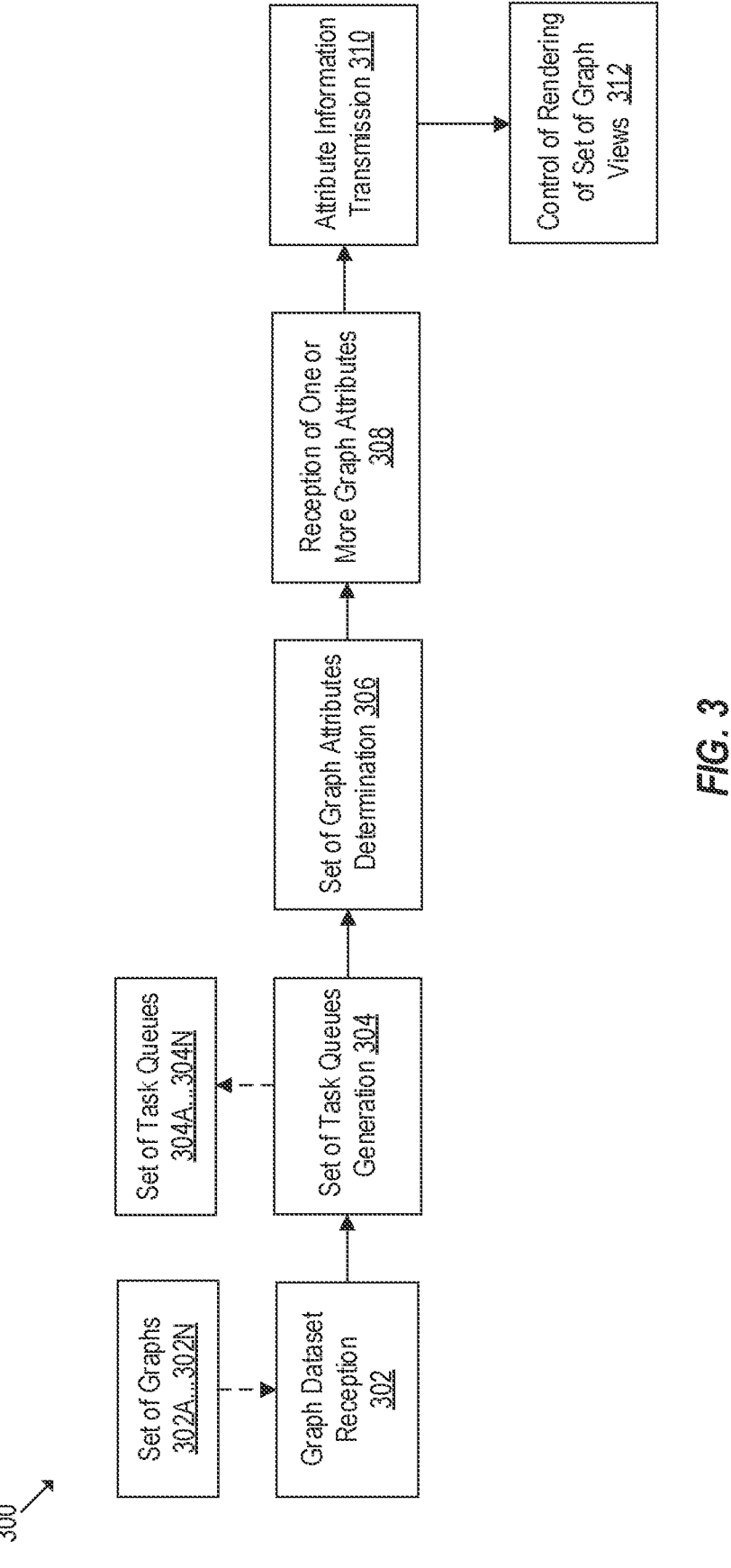
FIG. 3 is a diagram that illustrates an exemplary execution pipeline for graph set analysis and visualization for machine learning.

FIG. 3 is a diagram that illustrates an exemplary execution pipeline for graph set analysis and visualization for machine learning, in accordance with an embodiment of the disclosure. FIG. 3 is described in conjunction with elements from FIG. 1, and FIG. 2. With reference to FIG. 3, there is shown an execution pipeline 300. The exemplary execution pipeline 300 may include a sequence of operations that may be executed by the processor 204 of the electronic device 102 of FIG. 1 for graph set analysis and visualization for machine learning. In the execution pipeline 300, there is shown a sequence of operations that may start from 302 and end at 310.

At 302, a graph dataset may be received. In at least one embodiment, the processor 204 may be configured to receive the graph dataset that may include a set of graphs 302A . . . 302N. The graph dataset (i.e., the set of graphs 302A . . . 302N) may be received as input graph data that may be representative of a domain dataset. In an embodiment, the graph dataset may be stored on the database 108 and may be received from the database 108, via the server 106. For example, the received graph dataset may correspond to a finance-domain dataset, an ecommerce-domain dataset, a social network-domain dataset, a molecular chemistry-domain dataset, or a genetic expression data-domain dataset. In some embodiments, the processor 204 may receive data labels associated with the set of graphs 302A . . . 302N. The data labels may be received from the server 106.

At 304, a set of task queues 304A . . . 304N, configured to process the received graph dataset in parallel, may be generated by the task scheduler 112. In at least one embodiment, the processor 204 may be configured to generate, by use of the task scheduler 112, the set of task queues 304A . . . 304N that may be configured to process the received graph dataset (i.e., the set of graphs 302A . . . 302N) in parallel. The processing of the set of graphs 302A . . . 302N may include determination of graph attributes for each graph of the set of graphs 302A . . . 302N in parallel. Each task queue of the set of task queues 304A . . . 304N may process each graph of the set of graphs 302A . . . 302N in parallel, for determination of a graph attribute, at the same time instance.

In accordance with an embodiment, the processor 204 may determine, for each graph of the set of graphs 302A . . . 302N, whether a corresponding graph is a discrete graph or a continuous graph. If it is determined that the corresponding graph is a continuous graph, the processor 204 may extract a subgraph from the corresponding graph. Thereafter, the processor 204, by use of the task scheduler 112, may analyze each (discrete) graph of the set of graphs 302A . . . 302N and each subgraph (extracted from each continuous graph of the set of graphs 302A . . . 302N). Based on such analysis, the processor 204 may identify a set of graph attributes that may be required to be determined from each graph of the set of graphs 302A . . . 302N (i.e., the discrete graphs and the extracted subgraphs). Further, each graph of the set of graphs 302A . . . 302N may be assigned a graph identity (ID). The processor 204 may further create an entry for each graph ID and store the entry in a local database (e.g., in the memory 206 and/or the persistent data storage 208) or the database 108. The number of created entries may be equal to a number of graphs in the set of graphs 302A . . . 302N.

The identified set of graph attributes, to be determined from the set of graphs 302A . . . 302N, may correspond to one or more of, but not limited to, a set of graph properties, a set of graph features, or a set of graph structure plots. Further, the set of graph properties may include, but is not limited to, a number of nodes of a graph, a number of edges of a graph, a graph density, a graph diameter, a number of loops in a graph, a number of cliques in a graph, or a number of disjoint subgraphs in a graph. The set of graphs 302A . . . 302N may be analyzed based on the identified set of graph attributes to determine whether the set of graphs 302A . . . 302N may be used for training a graph machine learning model (i.e., a predictive model) to perform graph machine learning tasks.

The generated set of task queues 304A . . . 304N may be used for determination of the identified the set of graph properties in parallel. For example, the processor 204 may generate, by use of the task scheduler 112, seven task queues (i.e., the set of task queues 304A . . . 304N may include seven task queues). The seven task queues may be generated based on an identification of seven graph properties. The seven graph properties may be required to be analyzed to determine whether the set of graphs 302A . . . 302N is suitable for training the predictive model and generating explanations for predictions that may be generated by the predictive model. The seven task queues may be used for processing of the set of graphs 302A . . . 302N in parallel, for simultaneous determination of seven graph properties.

It may be understood by a person skilled in the art that the set of task queues 304A . . . 304N may be generic and a task queue may not be tied as such to a particular graph attribute. Further, the number of task queues may also be tunable. Higher the number of processors in the electronic device 102, higher may be the number of task queues in the set of task queues 304A . . . 304N. Moreover, a task to generate a graph attribute may be assigned to any task queue such that the computation of the graph properties may have no inter-dependency.

At 306, the set of graph attributes may be determined, by the set of task queues 304A . . . 304N, for each graph of the set of graphs 302A . . . 302N (i.e., the discrete graphs and the extracted subgraphs). In at least one embodiment, the processor 204 may be configured to determine, by use of the set of task queues 304A . . . 304N, the set of graph attributes for each graph of the set of graphs 302A . . . 302N (i.e., the discrete graphs and the extracted subgraphs). Each task queue of the set of task queues 304A . . . 304N may be used for determination of each attribute of the set of graph attributes. For example, the processor 204 may use the task queues 304A 304B, 304C, 304D, 304E, 304F, and 304G, to determine seven graph properties, such as, the number of nodes, the number of edges, the graph density, the graph diameter, the number of loops, the number of cliques, and the number of disjoint subgraphs, respectively, for each graph of the set of graphs 302A . . . 302N.

The processor 204 may use the set of task queues 304A . . . 304N to determine the set of attributes, for each graph of the set of graphs 302A . . . 302N, in parallel. The set of attributes may be determined (in parallel) for each graph. For example, the set of task queues 304A . . . 304N may simultaneously determine the set of properties (i.e., the number of nodes, the number of edges, the graph density, the graph diameter, the number of loops, the number of cliques, and the number of disjoint subgraphs) for the graph 302A. Thereafter, the set of task queues 304A . . . 304N may simultaneously determine the set of properties for the graph 302B. The simultaneous determination of the set of properties for the set of graphs 302A . . . 302N may continue till the set of properties are determined for the graph 302N.

A person having ordinary skill in the art will understand that the set of task queues 304A . . . 304N may either determine different graph attributes of the same graph 302B or determine the same graph attributes for the different graphs 302A . . . 302N, without departure from the scope of the disclosure.

In accordance with an embodiment, the processor 204 may store the values of the set of graph attributes, determined for each graph of the set of graphs 302A . . . 302N, in an entry (in the local database (such as, the memory 206 and/or the persistent data storage 208) or the database 108) created for a graph ID associated with a corresponding graph. In some embodiments, the processor 204 may generate a plot associated with each graph of the set of graphs 302A . . . 302N. The plot, generated for each graph of the set of graphs 302A . . . 302N, may be stored in the database 108 along with a graph ID associated with a corresponding graph. An entry corresponding to the graph ID may also be stored in the memory 206 and/or the persistent data storage 208. Additionally, and/or alternatively, both the generated plot and the graph ID may be stored as object-store data in the memory 206 and/or the persistent data storage 208.

At 308, one or more graph attributes of the determined set of graph attributes may be received by the web service 114. In at least one embodiment, the processor 204 may be configured to receive, by the web service 114, the one or more graph attributes of the determined set of graph attributes. The one or more graph attributes may be stored on the database 108, the memory 206, and/or the persistent data storage 208. The web service 114 may receive the stored one or more graph attributes from the database 108, the memory 206, and/or the persistent data storage 208. The web service 114 may transmit the determined one or more graph attributes to the client browser 116.

For example, the processor 204 may receive notifications, from the task scheduler 112, on completion of determination of the set of graph attributes for each graph of the set of graphs 302A . . . 302N, by the set of task queues 304A . . . 304N. At each reception of a notification, the processor 204 may determine whether a predefined number of graph attributes of the identified set of graph attributes have been determined (by use of the set of task queues 304A . . . 304N). The processor 204 may update a status of the API, which may exist between the web service 114 and the client browser 116, based on a determination of a predefined number of graph attributes of the identified set of graph attributes have been determined. The updated status may indicate, to the client browser 116, that the web service 114 may be ready to transmit partial results associated with the determination of the predefined number of graph attributes of the identified set of graph attributes to the client browser 116. The partial results may be transmitted based on reception of queries for the graph attributes from the client browser 116. Based on the updated status of the API, the web service 114 may retrieve the determined one or more graph attributes from the database 108, the memory 206, or the persistent data storage 208. Further, the web service 114 may transmit a predefined number of (determined and retrieved) graph attributes to the client browser 116, based on a reception of the queries for the determined graph attributes from the client browser 116.

In accordance with an embodiment, the processor 204 may further update the status of the API based on a determination that all graph attributes of the identified set of attributes have been determined by the set of task queues 304A . . . 304N. The determination may be based on reception of values of all graph attributes of the identified set of graph attributes for each graph of the set of graphs 302A . . . 302N. For example, the processor 204 may receive a notification from the task scheduler 112 that may indicate that the determination of all graph attributes is complete. The status of the API may be updated to indicate, to the client browser 116, that determination of the identified set of graph attributes for each graph of the set of graphs 302A . . . 302N is completed. The status of the API may further indicate that the web service 114 may be ready to transmit the determined set of graph attributes to the client browser 116, via the API. Based on the updated status of the web service 114, the web service 114 may transmit the set of graph attributes to the client browser 116, via the API, based on a request for at least one of the set of graph attributes. It may be noted that the processor 204, by use of the task scheduler 112, may remove an entry from a task queue of the set of task queues 304A . . . 304N after the task queue completes execution of a task to determine a certain graph attribute.

At 310, attribute information, including the received one or more graph attributes, may be transmitted, by the web service 114, to the client browser 116. In at least one embodiment, the processor 204 may be configured to transmit, by the web service 114, the attribute information, that may include the received one or more graph attributes, to the client browser 116. The web service 114 may transmit the attribute information to the client browser 116 based on a reception of queries for the one or more attributes of the set of graph attributes from the client browser 116. The one or more graph attributes, indicated in the received queries, may be selected by an end-user (associated with the user-end device 104), via the client browser 116.

In accordance with an embodiment, the processor 204 may filter the determined set of graph attributes associated with the set of graphs 302A . . . 302N based on the data labels associated with the set of graphs 302A . . . 302N. The set of graph attributes may be filtered for selection of the one or more graph attributes, from the set of graph attributes, as indicated in the queries. The processor 204 may transmit, via the web service 114, the filtered one or more graph attributes to client browser 116. The processor 204 may control a storage of the transmitted attribute information in an object cache associated with the client browser 116.

The client browser 116 may be configured to determine a set of graph views based on the transmitted attribute information. The set of graph views may include one or more of a one-dimensional graph view, a two-dimensional graph view, a graph set view, or a single graph view. The one-dimensional graph view may be determined based on a selection of one or more graph attributes of the determined set of graph attributes. The client browser 116 may receive the selection via a user input and generate a query that may include a request for values of the selected one or more graph attributes for each graph of the set of graphs 302A . . . 302N. Thereafter, the client browser 116 may transmit the query to the electronic device 102. Based on the reception of the query, the processor 204 may filter the determined set of graph attributes to retrieve the selected one or more graph attributes. The web service 114 may transmit the values of each of the selected one or more graph attributes, determined for each graph of the set of graphs 302A . . . 302N by a certain task queue of the set of task queues 304A . . . 304N. The one-dimensional graph view may be determined further based on a selection of a sorting technique. The values of the selected one or more graph attributes may be sorted based on the sorting technique for the determination of the one-dimensional graph view.

The two-dimensional graph view may be determined based on a selection of two graph attributes of the determined set of graph attributes. The two selected graph attributes may be a first graph property and a second graph property, each of which may be associated with each graph of the set of graphs 302A . . . 302N. The two-dimensional graph view may indicate a level of correlation between the first graph property and the second graph property, determined for each graph of the set of graphs 302A . . . 302N. The two-dimensional graph view may correspond to a plot between a first set of values of the first graph property and a second set of values of the second property.

A graph set view may be determined based on a selection of a graph attribute of the determined set of graph attributes. The graph set view may be indicative of values of the selected graph attribute determined for each graph of the set of graphs 302A . . . 302N.

The single graph view may be determined based on a selection of a graph of the set of graphs 302A . . . 302N. The single graph view may be indicative of the set of graph attributes determined for the selected graph. In some embodiments, the single graph view may be indicative of a representation of a subgraph of the selected graph.

At 312, rendering of the determined set of graph views may be controlled on the client browser 116. In at least one embodiment, the processor 204 may be configured to control the rendering of the determined set of graph views on the client browser 116. The rendering of the determined set of graph views may be controlled such that an end-user may be able to progress from a global exploration (based on the one-dimensional graph view) of the set of graphs 302A . . . 302N, to a selective relationship exploration and subgraph sampling exploration (based on the two-dimensional and the graph set views respectively), and, thereafter, to a selective single graph exploration (based on the single graph view).

In accordance with an embodiment, for rendering of the one-dimensional graph view, the processor 204 may control the client browser 116 such that different graph properties, determined for each graph of the set of graphs 302A . . . 302N, may be selected and plots associated with values of the different graph properties may be stacked against each other and displayed for a high-level visual comparison. Similarly, rendering, by the client browser 116, of the two-dimensional graph view may be controlled such that values of two selected graph properties, determined for each graph of the set of graphs 302A . . . 302N, may be plotted against each other for a correlation exploration. The rendering of the graph set view may be controlled such that subgraphs (that may be extracted from continuous graphs of the set of graphs 302A . . . 302N) may be sampled based on a selected graph property and a range of values of the selected graph property, and images of pre-generated plots associated with the sampled subgraphs may be displayed for a visual comparison. The rendering of the single graph view may be controlled such that a single selected subgraph and values of graph properties of the selected subgraph are displayed for facilitating a detailed interactive examination of the selected subgraph.

In accordance with an embodiment, the rendering of the determined set of graph views may be controlled such that, an end-user may be enabled to select multiple graph properties of the set of graph properties, remove other graph properties of the set of graph properties, and trigger generation of plots based on values of the selected graph properties for determination of the one-dimensional graph view. Thereafter, the end-user may be enabled to select two graph properties from previously selected multiple graph properties and use the determined two-dimensional graph view for examination of the correlation between the two selected graph properties. Further, the end-user may be enabled to select a graph property out of the two graph properties and use the graph set view to sample the set of graphs 302A . . . 302N and view subgraph structures of the set of graphs 302A . . . 302N. Thereafter, the end-user may be enabled to use single graph view on graphs of interest, which may be identified from the set of graphs 302A . . . 302N.

Embodiments of the disclosure may facilitate a global and local analysis of the graphs in a graph dataset based on graph attributes such as graph properties, graph properties, and graph structure. The embodiments may further enable visualization of correlation between the graphs in the graph dataset based on the graph attributes, determined for each graph in the graph dataset. The embodiments may allow arbitrary selection of any number or combination of graph attributes for determination of graph views of determined graph attributes. For example, the enablement of arbitrary selection of the graph attributes may simplify an analysis of graphs in a molecular chemistry-domain dataset. The graphs in the molecular chemistry-domain dataset may be discrete graphs that represent chemical molecules and may have multiple classification targets with different visualization requirements (i.e., require determination of multiple graph views). The graph views may enable exploration of the correlation between the graphs based on the determined graph attributes. The graph analysis, exploration, and visualization may allow bridging a knowledge gap that may exist between graph data (to be used for creating a predictive model) and graph machine learning. The knowledge gap may critically affect exploration of graphs in graph datasets, such as, finance-domain datasets, ecommerce-datasets, and social network-domain datasets. The minimization of the knowledge gap may allow validating a likelihood of success in the creation of the predictive model, using the graph data, that may be capable of executing graph machine learning tasks, and identifying means that may be applied for reducing training latency and computational resource requirement.

The embodiments allow rendering of a user-friendly electronic UI that allows selection of graph attributes of a set of determined graph attributes, selection of sorting techniques to be used for plotting selected graph attributes determined for each graph in a graph dataset and display of the plots of the selected graph attributes. The plots may correspond to graph views that allow a stepwise progression from a global analysis of the graph dataset to an exploration of graph attributes of a single graph in the graph dataset. The global analysis may be useful for graph datasets, such as, genome sequence-domain datasets which include large graphs. An individual graph exploration may be ineffective for such graphs. However, one-dimensional graph view, and two-dimensional graph view, determined based on graph attributes of the graphs in such datasets, may allow faster and accurate graph analysis, exploration, and visualization. The embodiments enable usage of task queues and database to parallelize and streamline computations of numerous graph attributes of each graph in the graph dataset. The embodiments facilitate a timely display of determined graph views, for real-time user interaction, by use of the API between the web service 114 and the client browser 116.

FIG. 4 is a diagram that illustrates a flowchart of an example method for determination of a set of graph attributes for each graph of a set of graphs, in accordance with an embodiment of the disclosure. FIG. 4 is described in conjunction with elements from FIG. 1, FIG. 2, and FIG. 3. With reference to FIG. 4, there is shown a flowchart 400. The method illustrated in the flowchart 400 may start at 402 and may be performed by any suitable system, apparatus, or device, such as, by the example electronic device 102 of FIG. 1, or the processor 204 of FIG. 2. Although illustrated with discrete blocks, the steps and operations associated with one or more of the blocks of the flowchart 400 may be divided into additional blocks, combined into fewer blocks, or eliminated, depending on the particular implementation.

At block 402, it may be determined, for each graph of the set of graphs (for example, the set of graphs 302A . . . 302N), whether a corresponding graph is a continuous graph. In an embodiment, the processor 204 may be configured to determine, for each graph of the set of graphs 302A . . . 302N, whether a corresponding graph is a continuous graph. Each graph of the set of graphs 302A . . . 302N may be determined as a continuous graph or a discrete graph. For example, a discrete graph may be a graph in which at least one node of the graph may not be reachable from the other nodes of the graph. On the other hand, a continuous graph may be a graph in which there may be no node of the graph which may not be accessible by other nodes of the graph. In other words, each node of the graph may be directly or indirectly accessible from the other nodes of the graph, in case of a continuous graph.

At block 404, a subgraph may be extracted from each graph of the set of graphs 302A . . . 302N, based on the determination that a corresponding graph of the set of graphs is a continuous graph. In an embodiment, the processor 204 may be configured to extract a subgraph from each graph of the set of graphs 302A . . . 302N based on the determination that the corresponding graph is a continuous graph. Thus, a set of subgraphs may be extracted from graphs of the set of graphs 302A . . . 302N that may be determined as continuous graphs. The set of task queues 304A . . . 304N may be generated based on the extracted set of subgraphs.

For each extracted subgraph, the processor 204 may identify one or more graph attributes that may be required to be determined. The processor 204 may further identify one or more graph attributes that may be required to be determined for each discrete graph of the set of graphs 302A . . . 302N. Thus, a set of graph attributes may be identified for the set of graphs 302A . . . 302N. The set of graph attributes may include the one or more graph attributes required to be determined for each extracted subgraph of the set of extracted subgraphs and the one or more graph attributes required to be determined for each discrete graph of the set of graphs 302A . . . 302N. Each task queue of the set of task queues 304A . . . 304N may be configured to determine a graph attribute of the set of graph attributes for each extracted subgraph and each discrete graph.

At block 406, it may be determined whether a first graph attribute of the set of graph attributes is determined for each subgraph of the extracted set of subgraphs and each discrete graph of the set of graphs 302A . . . 302N. In an embodiment, the processor 204 may be configured to determine whether the first graph attribute of the set of graph attributes is determined for each subgraph of the extracted set of subgraphs and each discrete graph of the set of graphs 302A . . . 302N. For example, the first graph attribute may be a graph property, such as, a number of disjoint subgraphs. The processor 204 may check whether a first task queue (for example, the task queue 304A) of the set of task queues 304A . . . 304N (which may be configured to determine the number of disjoint subgraphs) has determined the number of disjoint subgraphs in each extracted subgraph and number of disjoint subgraphs in each discrete graph.

At block 408, a first notification, indicative of a completion of a determination of the first graph attribute, may be transmitted by the first task queue of the set of task queues 304A . . . 304N to the web service 114. In an embodiment, the processor 204 may be configured to transmit, by use of the first task queue of the set of tasks queues 304A . . . 304N, the first notification indicative of completion of the determination of the first graph attribute to the web service 114. The transmission of the first notification may be based on the determination that the first graph attribute is determined for each subgraph of the extracted set of subgraphs and each discrete graph. The processor 204 may further store the first graph attribute, determined for each subgraph and each discrete graph, in the local database (e.g., the memory 206 and/or the persistent data storage 208) or the database 108.

The processor 204 may, similarly, determine whether other graph attributes of the set of graph attributes, are determined for each subgraph of the extracted set of subgraphs and each discrete graph of the set of graphs 302A . . . 302N. If it is determined that a predefined (or sufficient) number of graph attributes of the set of graph attributes have been determined, the processor 204 may update a status of an API between the web service 114 and the client browser 116. The updated status may indicate that the web service 114 may transmit the predefined number of determined graph attributes to the client browser 116 on reception of queries for values of the determined graph attributes. Based on the determined graph attributes received by the client browser 116, the client browser 116 may determine (or build) one or more graph views (such as a one-dimensional graph view a two-dimensional graph view, a graph-set view, or a single graph view).

At block 410, it may be determined whether each graph attribute, of the set of graph attributes, is determined for each subgraph of the extracted set of subgraphs and each discrete graph of the set of graphs 302A . . . 302N. In an embodiment, the processor 204 may be configured to determine whether each graph attribute, of the set of graph attributes, is determined for each subgraph of the extracted set of subgraphs and each discrete graph of the set of graphs 302A . . . 302N.

At block 412, a second notification, indicative of a completion of a determination of the set of graph attributes, may be transmitted, by each task queue of the set of task queues 304A . . . 304N, to the web service 114. In an embodiment, the processor 204 may be configured to transmit, by each task queue of the set of tasks queues 304A . . . 304N, the second notification, indicative of the completion of the determination of each graph attribute of the set of graph attributes, to the web service 114. The transmission of the second notification may be based on the determination that the set of graph attributes is determined for each subgraph of the extracted set of subgraphs and each discrete graph. The processor 204 may further store the set of graph attributes determined for each subgraph and each discrete graph, in the local database (the memory 206 and/or the persistent data storage 208) or the database 108.

The processor 204 may, thereafter, determine whether all graph attributes of the set of graph attributes, have been determined for each subgraph of the extracted set of subgraphs and each discrete graph of the set of graphs 302A . . . 302N. If it is determined that all graph attributes of the set of graph attributes have been determined, the processor 204 may update a status of the API. The updated status may indicate that the determination set of graph attributes is completed and, that, the web service 114 may transmit the set of determined graph attributes to the client browser 116 on reception of queries for the determined graph attributes from the client browser 116. Control may pass to end.

Although the flowchart 400 is illustrated as discrete operations, such as 402, 404, 406, 408, 410, and 412, the disclosure is not so limited. However, in certain embodiments, such discrete operations may be further divided into additional operations, combined into fewer operations, or eliminated, depending on the particular implementation without detracting from the essence of the disclosed embodiments.

Figure 5:
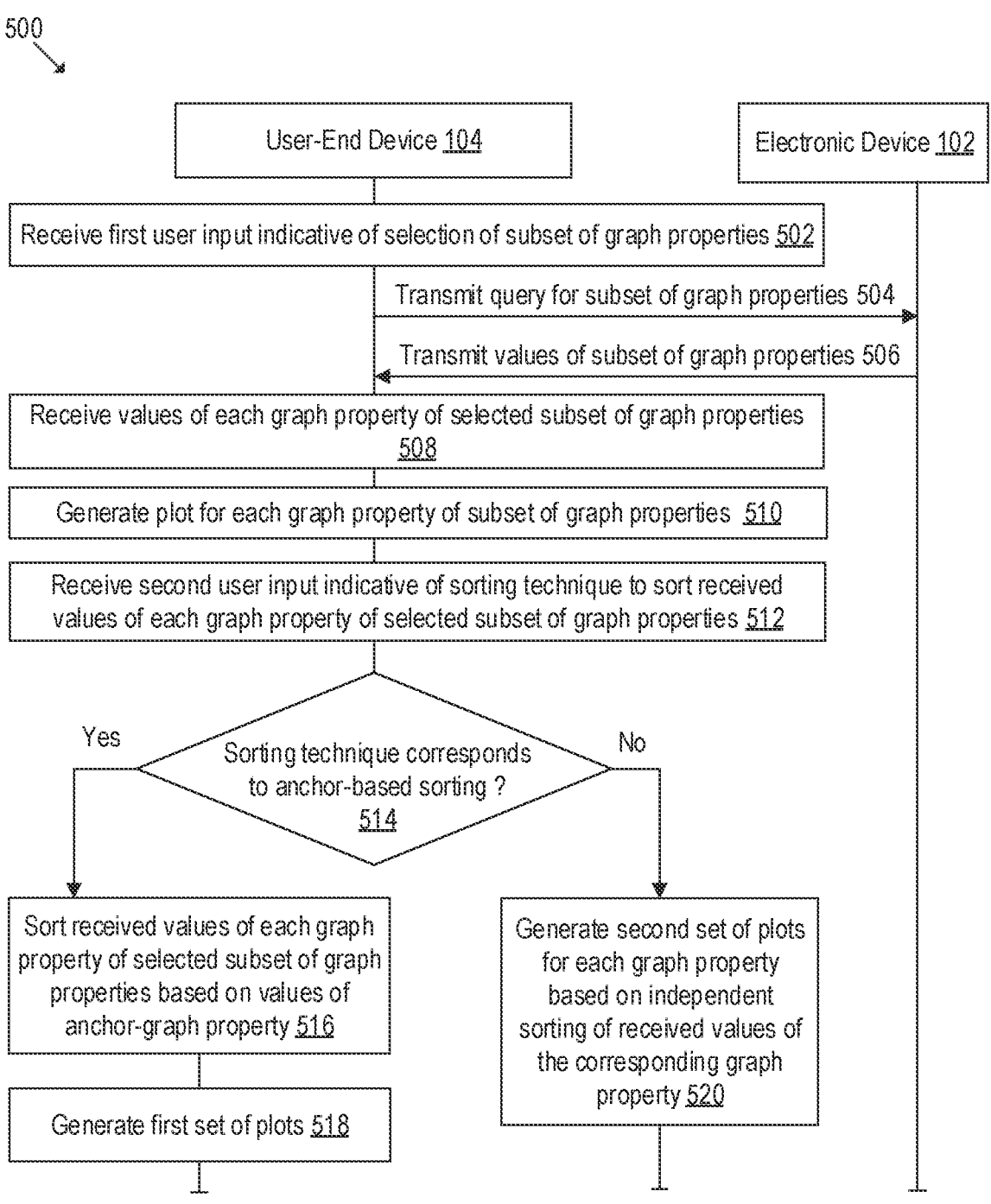
FIG. 5 is a diagram that illustrates exemplary operations for determination of a one-dimensional graph view on a client browser.

FIG. 5 is a diagram that illustrates exemplary operations for determination of a one-dimensional graph view on a client browser, in accordance with an embodiment of the disclosure. FIG. 5 is explained in conjunction with elements from FIG. 1, FIG. 2, FIG. 3, and FIG. 4. With reference to FIG. 5, there is shown a timeline 500 that illustrates exemplary operations 502, 504, 506, 508, 510, 512, 514, 516, and 518. The exemplary operations may be executed to control determination of a one-dimensional graph view on the client browser 116 based on attribute information transmitted by the electronic device 102. The exemplary operations may be executed by the electronic device 102 of FIG. 1 or the processor 204 of FIG. 2.

At 502, a first user input, indicative of a selection of a subset of graph properties of a set of graph properties, may be received. In an embodiment, the user-end device 104 may receive the first user input. The set of graph properties may be associated with the set of graph attributes determined by the electronic device 102. The client browser 116 may render an electronic UI for reception of user inputs indicative of selections of graph properties from the determined set of graph properties. The electronic UI may include UI elements corresponding to graph properties of the set of graph properties that may be available for user selection. The UI elements may be rendered based on a completion of a determination of the one or more graph properties for each graph of the set of graphs 302A . . . 302N. The first user input may be received via UI elements that may correspond to the selected subset of graph properties.

At 504, a query for the subset of graph properties may be transmitted to the electronic device 102. In an embodiment, the user-end device 104 may transmit the query for the subset of graph properties to the electronic device 102. The transmitted query may include the subset of graph properties. The query may be transmitted to the web service 114 via the API for reception of values of each graph property of the subset of graph properties, which have been determined by the electronic device 102 for each graph (i.e., each subgraph and each discrete graph) of the set of graphs 302A . . . 302N.

At 506, values of each graph property of the selected subset of graph properties may be transmitted, by the electronic device 102, to the client browser 116 based on the received query. In an embodiment, the processor 204 of the electronic device 102 may be configured to transmit, by the web service 114, the values of each graph property of the selected subset of graph properties (determined for each graph of the set of graphs 302A . . . 302N) to the client browser 116. The values of each graph property of the selected subset of graph properties may be transmitted via the API.

At 508, values of each graph property of the selected subset of graph properties (determined for each graph of the set of graphs 302A . . . 302N) may be received based on the received first user input. In an embodiment, the user-end device 104 may receive the values of each graph property of the selected subset of graph properties from the electronic device 102 based on the received first user input.

At 510, a plot may be generated for each graph property of the selected subset of graph properties. The client browser 116 of the user-end device 104 may generate the plot for each graph property based on the received values of a corresponding graph property, which may be determined for each graph of the set of graphs 302A . . . 302N. For example, an X-axis of the generated plot may include each graph (i.e., each subgraph and each discrete graph) of the set of graphs 302A . . . 302N. Further, a Y-axis of the generated plot may include received values of the corresponding graph property determined by a task queue of the set of task queues 304A . . . 304N (which may be configured to determine the corresponding graph property). Thus, a count of generated plots may be equal to number of graph properties in the selected subset of graph properties.

At 512, a second user input, indicative of a sorting technique to be used to sort the received values of each graph property of the selected subset of graph properties, may be received. In an embodiment, the user-end device 104 may be configured to receive the second user input via the electronic UI. The electronic UI may receive user inputs indicative of selections of sorting techniques that may be used for sorting the received values of each graph property determined for each graph of the set of graphs 302A . . . 302N. The electronic UI may include UI elements corresponding to the sorting techniques available for user selection. In an embodiment, the sorting techniques available for selection may be independent sorting or anchor-based sorting.

At 514, it may be determined whether the sorting technique corresponds to the anchor-based sorting of the received values of the selected graph property. The determination may be based on the received second user input. In an embodiment, the user-end device 104 may determine whether or not the sorting technique corresponds to the anchor-based sorting of the received values of the selected graph property.

At 516, the received values of each graph property of the selected subset of graph properties may be sorted based on received values of an anchor-graph property, which may be determined by the electronic device 102 for each graph of the set of graphs 302A . . . 302N. In an embodiment, the user-end device 104 may be configured to sort the received values of each graph property of the selected subset of graph properties based on received values of an anchor-graph property. Such sorting may be based on the determination that the sorting technique corresponds to the anchor-based sorting. In anchor-based sorting, a graph property of the selected subset of graph properties may be selected as an anchor-graph property. The received values of the anchor-graph property (which may be determined (by the electronic device 102) for each graph of the set of graphs 302A . . .

302N) may be sorted in an ascending order. The sorting may generate a sequence of graphs of the set of graphs 302A . . . 302N. For example, if the set of graphs 302A . . . 302N includes eight graphs, the generated sequence may be 302D, 302A, 302F, 302B, 302G, 302H, 302C, 302E. In an example, the value of the anchor-graph property determined for the graph 302D may be lowest among the eight graphs and the received value of the anchor-graph property determined for the graph 302E may be highest among the eight graphs. This may be because the values of the anchor-graph property, determined by the electronic device 102 for each graph of the set of graphs 302A . . . 302N, may be sorted in ascending order. Once the values of the anchor-graph property are sorted, the received values of each of the other graph properties of the selected subset of graph properties may also be sorted. For example, the graph properties (determined by the electronic device 102 for each graph of the set of graphs 302A . . . 302N) may be sorted based on the generated sequence of graphs (i.e., 302D, 302A, 302F, 302B, 302G, 302H, 302C, 302E).

At 518, a first set of plots may be generated by updating the plot generated (at 510) for each graph property, based on the sorted received values of the corresponding graph property. In an embodiment, the user-end device 104 may be configured to generate the first set of plots by updating the plot generated (at 510) for each property, based on the sorted received values of the corresponding graph property. For example, the Y-axis of each plot generated (at 510) for each graph property may be updated based on the sorted received values of a corresponding graph property, for the generation of each plot of the first set of plots. The first set of plots may correspond to a one-dimensional graph view. The first set of plots (i.e., the one-dimensional graph view) may indicate a correlation between a first property of the selected subset of graph properties and a second property of the selected subset of graph properties.

At 520, a second set of plots may be generated by updating the plot generated (at 510) for each graph property based on an independent sorting of received values (i.e., the Y-axis of the plot) of the corresponding graph property. In an embodiment, the user-end device 104 may be configured to generate the second set of plots by updating the plot generated (at 510) for each property, based on the independent sorting of received values (i.e., the Y-axis of the plot) of the corresponding graph property. For example, the received values of each graph property of the subset of graph properties may be sorted independently based on the determination that the sorting technique corresponds to the independent sorting. In case of the independent sorting, the received values of each graph property of the selected subset of graph properties (determined by the electronic device 102 for each graph of the set of graphs 302A . . . 302N) may be sorted in an ascending order. Thereafter, a plot of the second set of plots may be generated for each graph property, i.e., the Y-axis of the plot generated (at 510) for each graph property may be modified, based on the independently sorted (received) values of the corresponding graph property. The second set of plots may also correspond to the one-dimensional graph view.

Figure 6A:
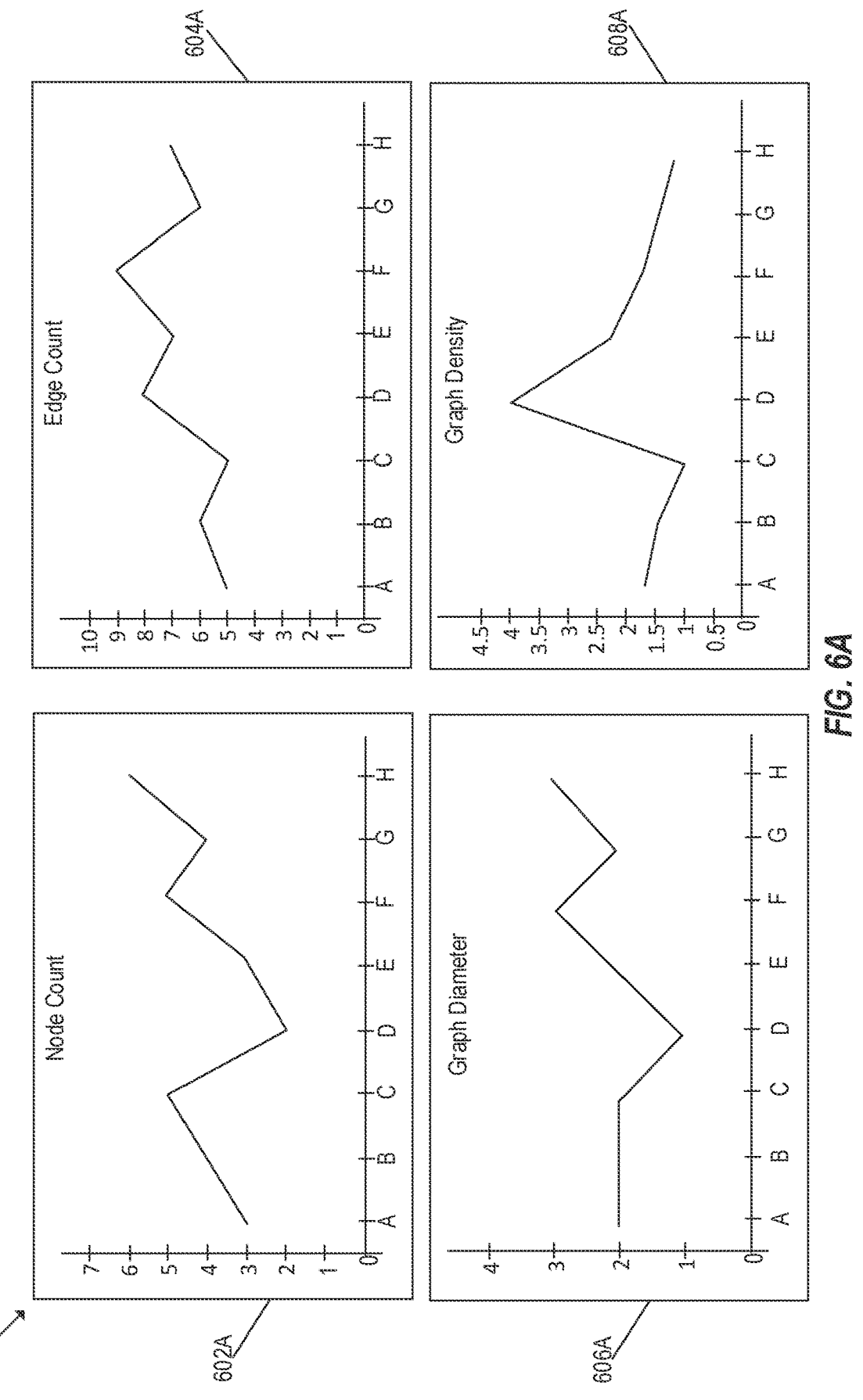
FIG. 6A is a diagram that illustrates an exemplary scenario of graphical plots indicative of a set of graph properties determined for each graph of a set of graphs.

FIG. 6A is a diagram that illustrates an exemplary scenario of graphical plots indicative of a set of graph properties determined for each graph of a set of graphs, in accordance with an embodiment of the disclosure. FIG. 6A is described in conjunction with elements from FIG. 1, FIG. 2, FIG. 3, FIG. 4, and FIG. 5. With reference to FIG. 6A, there is shown an exemplary scenario 600A. The scenario 600A includes graphical plots which indicate a set of graph properties determined for each graph of a set of graphs, such as, a graph "A", a graph "B", a graph "C", a graph "D", a graph "E", a graph "F", a graph "G", and a graph "H".

For example, as shown in the scenario 600A, the graphical plots include a first graphical plot 602A, a second graphical plot 604A, a third graphical plot 606A, and a fourth graphical plot 608A. Each graphical plot of the scenario 600A is a graphical representation of values of a certain graph property for various graphs of the set of graphs (e.g., the set of graphs 302A . . . 302N). In an example, as shown in FIG. 6A, the first graphical plot 602A may be a graphical representation of values of a graph property, for example, "node count", for the set of graphs, such as, the graph "A", the graph "B", the graph "C", the graph "D", the graph "E", the graph "F", the graph "G", and the graph "H". For example, the value of the graph property "node count" for the graph "A" may be "3", for the graph "B" may be "4", and so on. Similarly, the value of the graph property "node count" for the graph "H" may be "6". In another example, as shown in FIG. 6A, the second graphical plot 604A may be a graphical representation of values of a graph property, for example, "edge count", for the set of graphs, such as, the graph "A", the graph "B" . . . , and the graph "H". In yet another example, the third graphical plot 606A and the fourth graphical plot 608A may be graphical representations of values of graph properties, for example, "graph diameter" and "graph density", respectively, for the set of graphs, such as, the graph "A", the graph "B" . . . , and the graph "H".

Figure 6B:
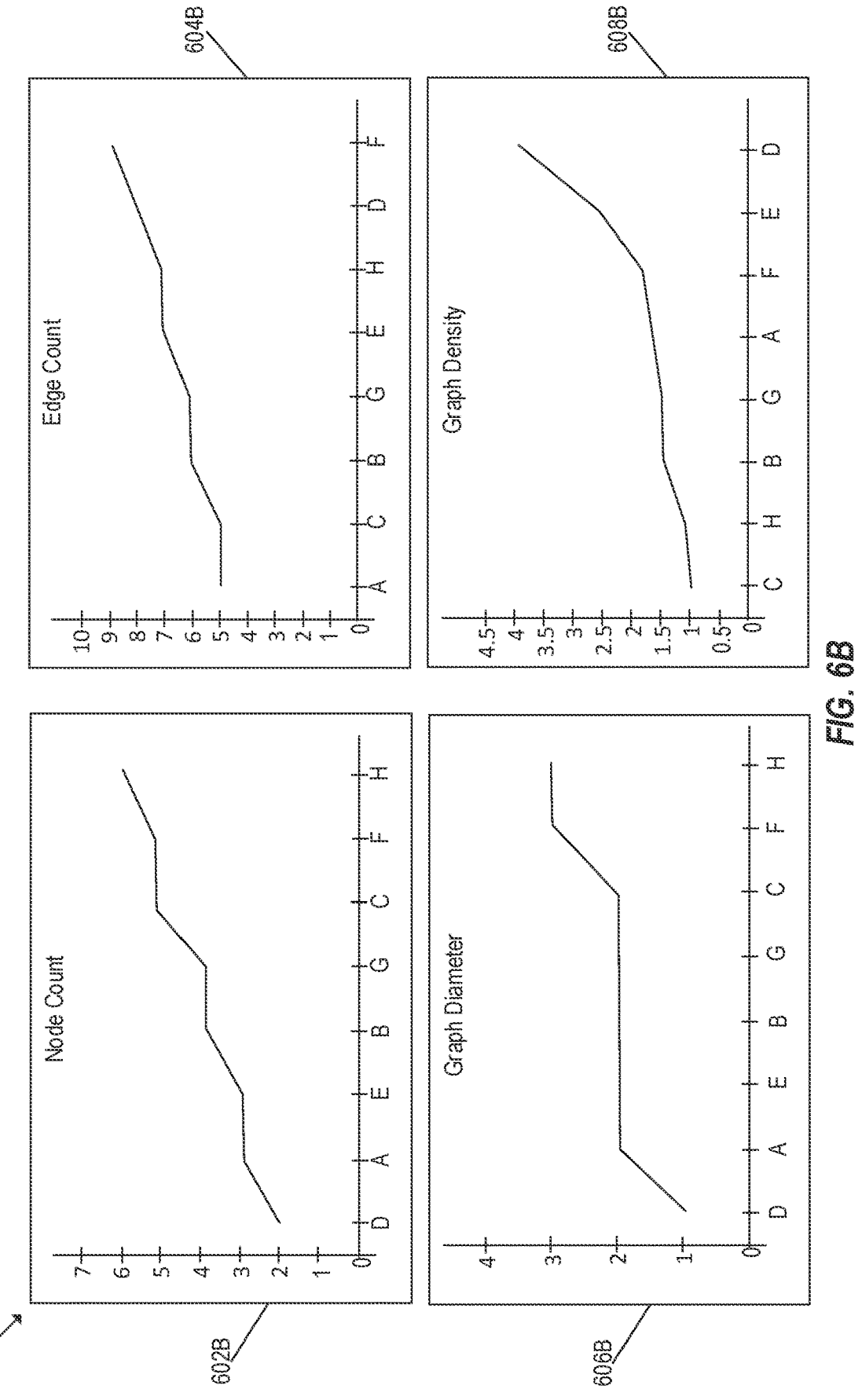
FIG. 6B is a diagram that illustrates an exemplary scenario of a one-dimensional graph view determined based on an independent sorting of graph properties of each graph of a set of graphs.

FIG. 6B is a diagram that illustrates an exemplary scenario of a one-dimensional graph view determined based on an independent sorting of graph properties of each graph of a set of graphs, in accordance with an embodiment of the disclosure. FIG. 6B is described in conjunction with elements from FIG. 1, FIG. 2, FIG. 3, FIG. 4, FIG. 5, and FIG. 6A. With reference to FIG. 6B, there is shown an exemplary scenario 600B. The scenario 600B includes a one-dimensional graph view determined based on an independent sorting of graph properties of each graph of a set of graphs, such as, a graph "A", a graph "B", a graph "C", a graph "D", a graph "E", a graph "F", a graph "G", and a graph "H".

For example, as shown, the scenario 600B includes graphical plots of graph properties for the set of graphs, which may be sorted independently based on values of the individual graph properties. The graphical plots include a first graphical plot 602B for the graph property "node count", a second graphical plot 602B for the graph property "edge count", a third graphical plot 606B for the graph property "graph diameter", and a fourth graphical plot 608B for the graph property "graph density". The set of graphs represented in each of the graphical plots of the scenario 600B may be sorted independently based on values of a respective graph property corresponding to the particular graphical plot. For example, in the first graphical plot 602B, the set of graphs, such as, the graph "A", the graph "B", . . . and the graph "H", may be sorted in ascending order of the values of the graph property "node count". The individually sorted order of the set of graphs in the first graphical plot 602B may be the graph "D" followed by the graphs "A", "E", "B", "G", "C", "F", and "H". Herein, the lowest value of the graph property "node count" may be "2" (for the graph "D") and the highest value of the graph property "node count" may be "6" (for the graph "H"). Similarly, the second graphical plot 604B may represent values of the graph property "edge count" for the set of graphs, which may be individually sorted in ascending order based on the values of the graph property "edge count" for each graph of the set of graphs. The individually sorted order of the set of graphs in the second graphical plot 604B may be the graph "A" followed by the graphs "C", "B", "G", "E", "H", "D", and "F". Herein, the lowest value of the graph property "edge count" may be "5" (for the graph "A") and the highest value of the graph property "edge count" may be "9" (for the graph "F"). The third graphical plot 606B and the fourth graphical plot 608B may similarly include a representation of particular graph properties (such as, "graph diameter" and "graph density" respectively) for the set of graphs, which may be individually sorted in ascending order based on values of the corresponding graph properties. It may be appreciated that the graphical plots of the scenario 600B may be useful to determine a range and distribution of values of the various graph properties, on a global-level.

Figure 6C:
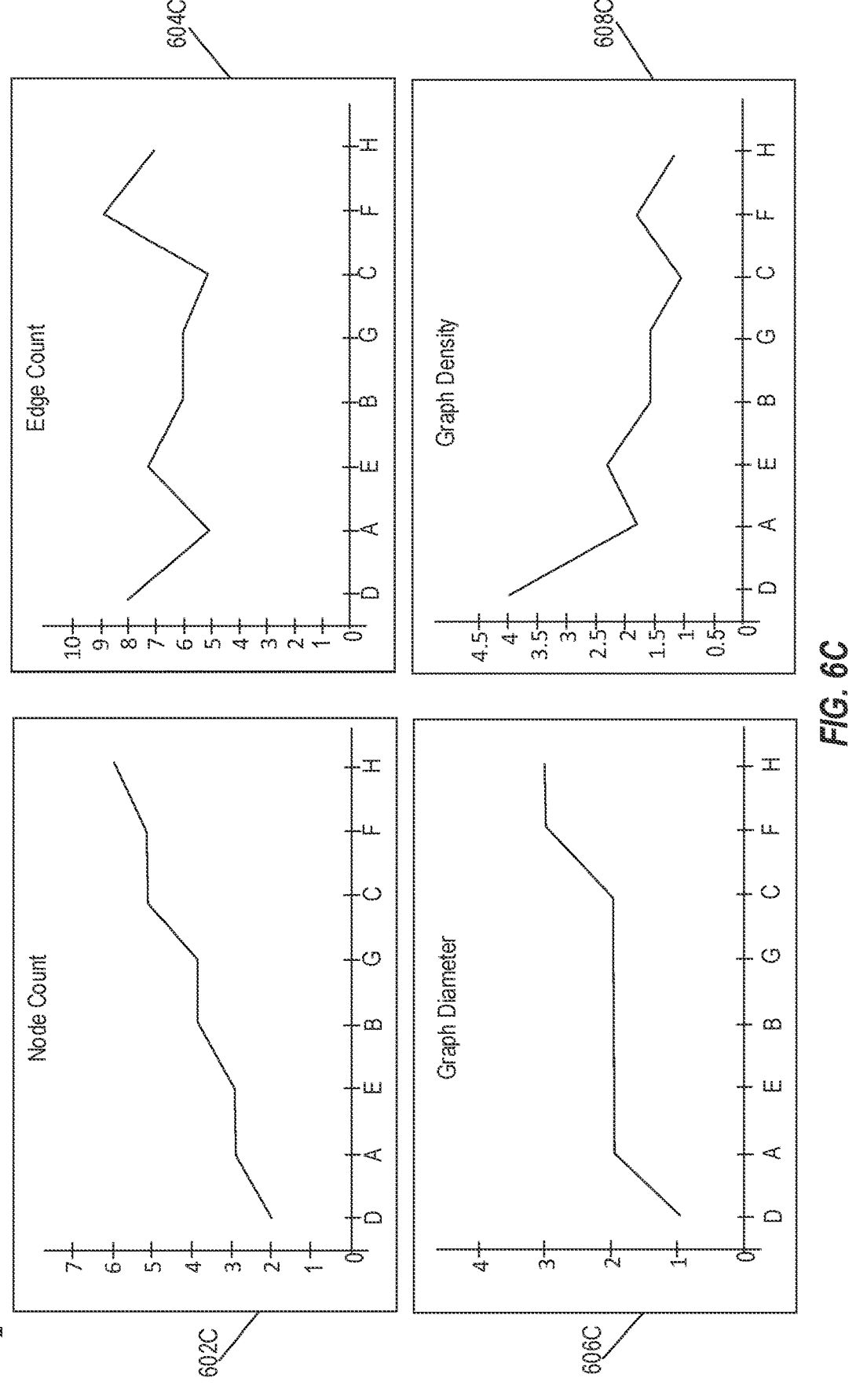
FIG. 6C is a diagram that illustrates an exemplary scenario of a one-dimensional graph view determined based on sorting of graph attributes based on an anchor graph property for each graph of a set of graphs.

FIG. 6C is a diagram that illustrates an exemplary scenario of a one-dimensional graph view determined based on sorting of graph attributes based on an anchor graph property for each graph of a set of graphs, in accordance with an embodiment of the disclosure. FIG. 6C is described in conjunction with elements from FIG. 1, FIG. 2, FIG. 3, FIG. 4, FIG. 5, FIG. 6A and FIG. 6B. With reference to FIG. 6C, there is shown an exemplary scenario 600C. The scenario 600C includes a one-dimensional graph view determined based on sorting of graph attributes based on an anchor graph property for each graph of a set of graphs, such as, a graph "A", a graph "B", a graph "C", a graph "D", a graph "E", a graph "F", a graph "G", and a graph "H".

For example, as shown, the scenario 600C includes graphical plots of graph properties for the set of graphs, wherein the graph attributes may be sorted based on an anchor graph property for each graph of a set of graphs. The graphical plots include a first graphical plot 602C for the graph property "node count", a second graphical plot 604C for the graph property "edge count", a third graphical plot 606C for the graph property "graph diameter", and a fourth graphical plot 608C for the graph property "graph density". The set of graphs represented in each of the graphical plots of the scenario 600C may be sorted based on a sorting order of the set of graphs for an anchor graph property. In an example, the anchor graph property may be "node count". In the first graphical plot 6C, the set of graphs may be sorted in an ascending order of respective values of the property "node count". For example, the sorted order of the set of graphs in the first graphical plot 602C may be the graph "D" followed by the graphs "A", "E", "B", "G", "C", "F", and "H". In the current case, as the graph property "node count" may be the anchor graph property, a sorting order of the set of graphs in each of the graphical plots 604C, 606C, and 606C may be same as the sorting order of the set of graphs in the first graphical plot 602C. Thus, the sorting order of the set of graphs for each graphical plot in the scenario 600C may be the graph "D" followed by the graphs "A", "E", "B", "G", "C", "F", and "H". It may be appreciated that the graphical plots of the scenario 600C may be useful to determine whether or not correlation exists between values of a first property and a second property of a set of attributes associated with the determined set of attributes, on a per-graph level. For example, based on the graphical plots of the scenario 600C, it may be determined that the graph properties "node count" and "graph diameter" may be correlated with each other, while the other graph properties may not be correlated with each other.

It should be noted that the scenarios 600A, 600B, and 600C of FIGS. 6A, 6B, and 6C, respectively, are for exemplary purposes and should not be construed to limit the scope of the disclosure.

FIG. 7 is a diagram that illustrates exemplary operations for control of rendering of a graph set view on a client browser, in accordance with an embodiment of the disclosure. FIG. 7 is explained in conjunction with elements from FIG. 1, FIG. 2, FIG. 3, FIG. 4, FIG. 5, FIG. 6A, FIG. 6B, and FIG. 6C. With reference to FIG. 7, there is shown a timeline 700 that illustrates exemplary operations 702, 704, 706, 708, 710, 712, 714, 716, 718, 720, 722, and 724. The exemplary operations may be executed to control rendering of a graph set view on the client browser 116 based on attribute information transmitted by the electronic device 102. The exemplary operations may be executed by the electronic device 102 of FIG. 1 or the processor 204 of FIG. 2.

At 702, a third user input, indicative of a selection of a graph property from the set of graph properties, may be received. In an embodiment, the user-end device 104 may be configured to receive the third user input that may be indicative of a selection of a graph property from the set of graph properties of the set of graphs 302A . . . 302N. The set of graph properties may be associated with the set of graph attributes determined by the electronic device 102. The client browser 116 may render an electronic UI for reception of user inputs indicative of selections of a graph property from the determined set of graph properties. The electronic UI may include UI elements corresponding to graph properties of the set of graph properties that may be available for user selection. The UI elements may be rendered based on a completion of a determination of the one or more graph properties for each graph of the set of graphs 302A . . . 302N. The third user input may be received via UI elements that may correspond to the selection of the graph property.

At 704, the received third user input may be transmitted. In an embodiment, the user-end device 104 may be configured to transmit the received third user input to the electronic device 102. For example, the client browser 116 may transmit the third user input to the web service 114. The web service 114 may receive the third user input via the API associated with the web service 114 and the client browser 116.

At 706, a value of the selected graph property may be transmitted for each graph of the set of graphs 302A . . . 302N. In an embodiment, the electronic device 102 may be configured to transmit the value of the selected graph property for each graph of the set of graphs 302A . . . 302N. Based on the reception of the third user input by the web service 114, the processor 204 of the electronic device 102 may extract the value of the selected graph property for each graph of the set of graphs 302A . . . 302N. The value of the selected graph property may be transmitted from the web service 114 to the client browser 116 via the API associated with the web service 114 and the client browser 116.

At 708, values of the selected graph property for each graph of the set of graphs 302A . . . 302N may be received. In an embodiment, the user-end device 104 may be configured to receive the values of the selected graph property for each graph of the set of graphs 302A . . . 302N. The values of the selected graph property may be received by the client browser 116 of the user-end device 104 from the web service 114 of the electronic device 102, via the API associated with the web service 114 and the client browser 116.

At 710, the received values of the selected graph property may be sorted. In an embodiment, the client browser 116 associated with the user-end device 104 may be configured to sort the received values of the selected graph property. For example, the received values of the selected graph property may be sorted in an ascending order.

At 712, a fourth user input, indicative of a selection of a value range for the selected graph property, may be received. In an embodiment, the user-end device 104 may be configured to receive the fourth user input via the electronic UI. The electronic UI may receive user inputs indicative of a selection of a value range (e.g., a maximum value and a minimum value) for the selected graph property for each graph of the set of graphs 302A . . . 302N. The electronic UI may include UI elements corresponding to the values of the selected graph property for the various graphs in the set of graphs 302A . . . 302N. In an example, the electronic UI may include a sliding window selector of a predefined width to select values of the selected graph property that lie within a range of the sliding window selector, as the value range to be selected for the user.

At 714, a plurality of graphs may be sampled from the set of graphs 302A . . . 302N based on the value range. In an embodiment, the client browser 116 of the user-end device 104 may sample the plurality of graphs from the set of graphs 302A . . . 302N, based on the value range. For example, in case the selected graph property is "node count" and the selected value range for "node count" is from "3 to 5", the client browser 116 of the user-end device 104 may sample a plurality of graphs from the set of graphs 302A . . . 302N for which the "node count" lie between 3 nodes to 5 nodes.

At 716, a request for graph images of the sampled plurality of graphs may be transmitted. In an embodiment, the client browser 116 of the user-end device 104 may be configured to transmit a request for graph images of the sampled plurality of graphs. The transmitted request for graph images may be received by the web service 114 of the electronic device 102, via the API associated with the client browser 116 and the web service 114.

At 718, the requested graph images of the sampled plurality of graphs may be transmitted. In an embodiment, the web service 114 of the electronic device 102 may be configured to transmit the requested graph images of the sampled plurality of graphs, based on the received request for the graph images. In an embodiment, based on the received request for the graph images, the web service 114 may extract a set of graph images from graph data of the set of graphs 302A . . . 302N stored in the local storage (e.g., the memory 206 and/or the persistent data storage 208) or the database 108.

At 720, a first set of images associated with each graph of the sampled plurality of graphs. In an embodiment, the client browser 116 of the user-end device 104 may receive the first set of images associated with each graph of the sampled plurality of graphs. The first set of images (i.e., graph images) may be received from the web service 114, via the API associated with the web service 114 and the client browser 116. The first set of images may be received based on the request of graph images of the sampled plurality of graphs. For example, the first set of images may be extracted by the web service 114 based on the request for the graph images of the sampled plurality of graphs, from the client browser 116.

In addition to the first set of images, the web service 114 may also be configured to extract certain other graph images, such as, a second set of images, which may be associated with a subset of graphs of the set of graphs, other than the sampled plurality of graphs. For example, the subset of graphs may be similar to the sampled plurality of graphs based on the values of the selected graph property and the value range. As an example, the plurality of graphs may be sampled for the selected graph property "node count" and the value range of "3 to 5 nodes". In such case, a subset of graphs may be graphs that may have a node count between 2 to 6 nodes and thus may be similar to the sampled plurality of graphs. Graph images of such similar subset of graphs may also be extracted by the web service 114 as the second set of images. The web service 114 may transmit such second set of images to the client browser 116 as a set of anticipated or look-ahead images. The client browser 116 may receive the second set of images, which may be associated with graphs other than the sampled plurality of graphs, of the set of graphs 302A . . . 302N. The web service 114 may control a storage of one or more of the received first set of images or the received second set of images in an image cache associated with the client browser 116.

At 722, a fifth user input, indicative of a plot type to represent values of the selected graph property for each of the sampled plurality of graphs, may be received. In an embodiment, the user-end device 104 may be configured to receive the fifth user input that may be indicative of a plot type to represent values of the selected graph property for each of the sampled plurality of graphs. The client browser 116 may render an electronic UI for reception of user inputs indicative of selections of a plot type for the representation of the values of the selected graph property for each of the sampled plurality of graphs. The electronic UI may include UI elements corresponding to the different plot types to represent data associated with the selected graph property that may be available for user selection. In an embodiment, plot types may include, but are not limited to, a graphical layout (for representation of one or more graphs), such as, a spring layout, a spectral layout, a circular layout, or a shell layout. The UI elements may be rendered based on a completion of a determination of the one or more graph properties for each graph of the set of graphs 302A . . . 302N. The fifth user input may be received via UI elements that may correspond to the selection of the plot type.

At 724, the values of the selected graph property may be plotted based on the plot type indicated in the fifth user input. In an embodiment, the client browser 116 of the user-end device 104 may be configured to plot the values of the selected graph property based on the plot type indicated in the fifth user input. In an embodiment, received first set of images associated with each graph of the sampled plurality of graphs may correspond to a representation of the corresponding graph in a layout including one of, but not limited to, a spring layout, a spectral layout, a circular layout, or a shell layout. The plotted values of the selected graph property may correspond to a graph set view. An example of a scenario of rendering of the graph set view is described, for example, in FIG. 8.

Figure 8:
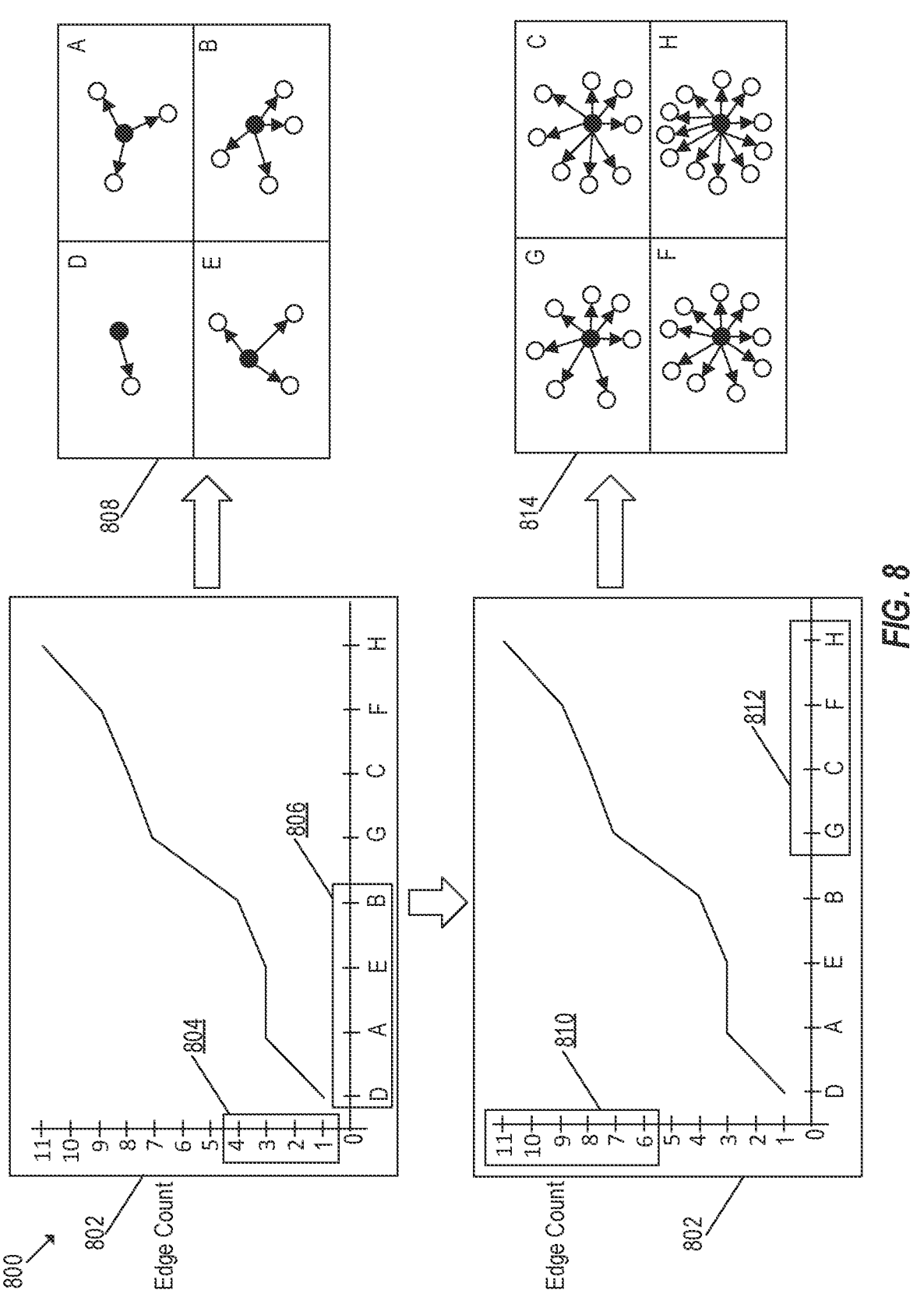
FIG. 8 is a diagram that illustrates an exemplary scenario of graph set views determined based on selection of a value-range of a graph property of a set of graphs.

FIG. 8 is a diagram that illustrates an exemplary scenario of graph set views determined based on selection of a value-range of a graph property of a set of graphs, in accordance with an embodiment of the disclosure. FIG. 8 is described in conjunction with elements from FIG. 1, FIG. 2, FIG. 3, FIG. 4, FIG. 5, FIG. 6A, FIG. 6B, FIG. 6C, and FIG. 7. With reference to FIG. 8, there is shown an exemplary scenario 800. The scenario 800 may include a graphical plot 802 of values of a selected graph property, such as, the graph property "node count" for a set of graphs, such as, graphs "A", "B", "C", "D", "E", "F", "G", and "H". The set of graphs may be sorted in the graphical plot 802, based on an ascending order of the values of the selected graph property, i.e., "node count" for each of the set of graphs. For example, the sorted order of the set of graphs may be the graph "D" followed by the graphs "A", "E", "B", "G", "C", "F", and "H".

The client browser 116 may render an electronic UI that may include UI elements to enable a user to provide a user input (e.g., the fourth user input) indicative of a selection of a value range for sampling of a plurality of graphs from the set of graphs, based on the values of the selected graph property (i.e., "node count") for each of the set of graphs. For example, through the electronic UI, the client browser 116 may receive a user input of a value range, such as, a range of node counts between 1 to 4 nodes (as depicted in a first value range 804). Based on the received user input (i.e., the first value range 804), the graphs "D", "A", "E", and "B" (together shown as a first set of sampled graphs 806) may be sampled and selected from the set of graphs "A", "B" . . . "H". The first set of sampled graphs 806 (i.e., the graphs "D", "A", "E", and "B") may be rendered as a first graph set view 808. As shown in FIG. 8, the first graph set view 808 includes four graphs rendered in four quadrants of a UI. In an example, the graph "D" (displayed in a first quadrant) may include one node and the graph "A" (displayed in a second quadrant) may include three nodes. Similarly, the graph "E" (displayed in a third quadrant) may include three nodes and the graph "B" (displayed in a fourth quadrant) may include four nodes.

In an example, through the electronic UI, the client browser 116 may receive a user input of another value range, such as, a range of node counts between 6 to 11 nodes (as depicted in a second value range 810). Based on the received user input (i.e., the second value range 810), the graphs "G", "C", "F", and "H" (together shown as a second set of sampled graphs 812) may be sampled and selected from the set of graphs "A", "B" . . . "H". The second set of sampled graphs 812 (i.e., the graphs "G", "C", "F", and "H") may be rendered as a second graph set view 814. As shown in FIG. 8, the second graph set view 814 includes four graphs rendered in four quadrants of a UI. In an example, the graph "G" (displayed in a first quadrant) may include seven nodes and the graph "C" (displayed in a second quadrant) may include eight nodes. Similarly, the graph "F" (displayed in a third quadrant) may include nine nodes and the graph "H" (displayed in a fourth quadrant) may include eleven nodes. The graph set view may be used to identify graphs that have similar values for certain graph property and analyze such similar graphs together for the particular graph property. For example, the first set of sampled graphs 806 (rendered in the first graph set view 808) may have a lower range of node counts, whereas the second set of sampled graphs 812 (rendered in the second graph set view 814) may have a higher range of node counts.

It should be noted that the scenario 800 is for exemplary purposes and should not be construed to limit the scope of the disclosure.

FIG. 9 is a diagram that illustrates a flowchart of an example method for graph set analysis and visualization of graph set views for graph machine learning, in accordance with an embodiment of the disclosure. FIG. 9 is described in conjunction with elements from FIG. 1, FIG. 2, FIG. 3, FIG. 4, FIG. 5, FIG. 6A, FIG. 6B, FIG. 6C, FIG. 7, and FIG. 8. With reference to FIG. 9, there is shown a flowchart 900. The method illustrated in the flowchart 900 may start at 902 and may be performed by any suitable system, apparatus, or device, such as, by the example electronic device 102 of FIG. 1, or the processor 204 of FIG. 2. Although illustrated with discrete blocks, the steps and operations associated with one or more of the blocks of the flowchart 900 may be divided into additional blocks, combined into fewer blocks, or eliminated, depending on the particular implementation.

At block 902, rendering of an electronic UI, including one or more UI elements corresponding to a set of graph views associated with a set of graphs (for example, the set of graphs 118A . . . 118N), may be controlled on a client browser (for example, the client browser 116). In an embodiment, the processor 204 may be configured to control the rendering of the electronic UI that may include the one or more UI elements corresponding to the set of graph views associated with the set of graphs 118A . . . 118N on the client browser 116. Details of controlling of the rendering of the electronic UI are further provided, for example, in FIG. 3 FIG. 5, FIG. 6A, FIG. 6B, FIG. 6C, FIG. 7, and FIG. 8.

At block 904, a user input, indicative of a selection of the set of graphs 118A . . . 118N from a plurality of graphs, may be received via the rendered electronic UI. In an embodiment, the processor 204 may be configured to receive, via the rendered electronic UI, the user input indicative of the selection of the set of graphs from the plurality of graphs.

At block 906, a graph dataset 118 including the set of graphs 118A . . . 118N may be received. In an embodiment, the processor 204 may be configured to receive the graph dataset 118 including the set of graphs 118A . . . 118N. Details of reception of the graph dataset 118 including the set of graphs 118A . . . 118N are further provided, for example, in FIG. 1 and FIG. 3.

At block 908, a set of task queues (for example, the set of task queues 120A . . . 120N), configured to process the received graph dataset 118 in parallel, may be generated by a task scheduler (for example, the task scheduler 112). In an embodiment, the processor 204 may be configured to generate, by the task scheduler 112, the set of task queues 120A . . . 120N that may be configured to process the received graph dataset 118 in parallel. Details of generation of the set of task queues 120A . . . 120N are further provided, for example, in FIG. 1, and FIG. 3.

At block 910, a set of graph attributes may be determined, by the set of task queues 120A . . . 120N, for each graph of the set of graphs 118A . . . 118N. In an embodiment, the processor 204 may be configured to determine, by the set of task queues 120A . . . 120N, a set of graph attributes for each graph of the set of graphs 118A . . . 118N. Details of determination of the set of graph attributes are further provided, for example, in FIG. 1, FIG. 3, FIG. 4, FIG. 5, FIG. 6A, FIG. 6B, FIG. 6C, FIG. 7, and FIG. 8.

At block 912, one or more graph attributes of the determined set of graph attributes may be received by the web service 114. In an embodiment, the processor 204 may be configured to receive, by the web service 114, the one or more graph attributes of the determined set of graph attributes. Details of reception of the one or more graph attributes are further provided, for example, in FIG. 1, FIG. 3, FIG. 4, FIG. 5, FIG. 6A, FIG. 6B, FIG. 6C, FIG. 7, and FIG. 8.

At block 914, attribute information, including the received one or more graph attributes, may be transmitted, by the web service 114, to the client browser 116. In an embodiment, the processor 204 may be configured to transmit, by the web service 114, the attribute information including the received one or more graph attributes to the client browser 116. The client browser 116 may be configured to determine the set of graph views based on the transmitted attribute information. Details of transmission of the attribute information are further provided, for example, in FIG. 1, FIG. 3, FIG. 5, FIG. 6A, FIG. 6B, FIG. 6C, FIG. 7, and FIG. 8. Control may pass to end.

Although the flowchart 900 is illustrated as discrete operations, such as 902 904, 906, 908, 910, 912, and 914, the disclosure is not so limited. However, in certain embodiments, such discrete operations may be further divided into additional operations, combined into fewer operations, or eliminated, depending on the particular implementation without detracting from the essence of the disclosed embodiments.

Various embodiments of the disclosure may provide one or more non-transitory computer-readable storage media configured to store instructions that, in response to being executed, cause a system (such as, the example electronic device 102) to perform operations. The operations may include receiving a graph dataset (for example, the graph dataset 118) including a set of graphs (for example, the set of graphs 118A . . . 118N). The operations may further include generating, by a task scheduler (for example, the task scheduler 112), a set of task queues (for example, the set of task queues 120A . . . 120N) that may be configured to process the received graph dataset 118 in parallel. The operations may further include determining, by the set of task queues 120A . . . 120N, a set of graph attributes for each graph of the set of graphs 118A . . . 118N. The operations may further include receiving, by the web service 114, one or more graph attributes of the determined set of graph attributes. The operations may further include transmitting, by the web service 114, attribute information including the received one or more graph attributes to a client browser (for example, the client browser 116). The operations may further include controlling rendering of a set of graph views, determined by the client browser 116 based on the transmitted attribute information, on the client browser 116.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, executed by a processor, comprising:

receiving a graph dataset including a set of graphs;

generating, by a task scheduler, a set of task queues configured to process the received graph dataset in parallel;

determining, by the set of task queues, a set of graph attributes for each graph of the set of graphs;

receiving, by a web service, one or more graph attributes of the determined set of graph attributes;

transmitting, by the web service, attribute information including the received one or more graph attributes to a client browser, wherein the client browser is configured to determine a set of graph views based on the transmitted attribute information; and controlling rendering of the determined set of graph views on the client browser, the method further comprising:

determining, for each graph of the set of graphs, whether a corresponding graph is a continuous graph;

extracting a subgraph from each graph of the set of graphs, based on the determination that a corresponding graph is a continuous graph, for extraction of a set of subgraphs, wherein the set of task queues is generated based on the extracted set of subgraphs;

determining whether a first graph attribute of the set of graph attributes, is determined for each subgraph of the extracted set of subgraphs and each discrete graph of the set of graphs;

transmitting, by a first task queue of the set of tasks queues, a first notification, indicative of a completion of a determination of the first graph attribute, to the web service based on the determination that the first graph attribute is determined for each subgraph of the extracted set of subgraphs and each discrete graph of the set of graphs;

determining whether each graph attribute, of the set of graph attributes, is determined for each subgraph of the extracted set of subgraphs and each discrete graph of the set of graphs; and transmitting, by each task queue of the set of tasks queues, a second notification, indicative of a completion of a determination of the set of graph attributes, to the web service based on the determination that each graph attribute of the set of graph attributes is determined for each subgraph of the extracted set of subgraphs and each discrete graph of the set of graphs.

2. The method according to claim 1, wherein the determined set of graph attributes corresponds to one or more of a set of graph properties, a set of graph features, or a set of graph structure plots.

3. The method according to claim 2, wherein the set of graph properties includes one or more of a number of nodes of a graph, a number of edges of a graph, a graph density, a graph diameter, a number of loops in a graph, a number of cliques in a graph, or a number of disjoint subgraphs in a graph.

4. The method according to claim 1, wherein the determined set of graph views includes one or more of a one-dimensional graph view, a two-dimensional graph view, a graph set view, or a single graph view.

5. The method according to claim 1, further comprising controlling a storage of the transmitted attribute information in an object cache associated with the client browser.

6. The method according to claim 1, further comprising filtering the determined set of graph attributes associated with the set of graphs, based on data labels associated with the set of graphs.

7. The method according to claim 1, wherein a two-dimensional graph view corresponds to a plot between a first set of values of a first property of the graph and a second set of values of a second property of the graph.

8. The method according to claim 7, wherein the two-dimensional view of the graph is indicative of a level of correlation between the first graph property and the second graph property.

9. The method according to claim 1, wherein a single graph view is indicative of a representation of a subgraph of a graph.

10. The method according to claim 1, wherein the received first dataset corresponds to at least one of a finance-domain dataset, an ecommerce-domain dataset, a social network-domain dataset, a molecular chemistry-domain dataset, or a genome sequence-domain dataset.

11. A method, executed by a processor, comprising:

receiving a graph dataset including a set of graphs;

generating, by a task scheduler, a set of task queues configured to process the received graph dataset in parallel;

determining, by the set of task queues, a set of graph attributes for each graph of the set of graphs;

receiving, by a web service, one or more graph attributes of the determined set of graph attributes;

transmitting, by the web service, attribute information including the received one or more graph attributes to a client browser, wherein the client browser is configured to determine a set of graph views based on the transmitted attribute information; and controlling rendering of the determined set of graph views on the client browser, the method further comprising:

receiving a first user input indicative of a selection of a subset of graph properties of a set of graph properties associated with the determined set of graph attributes;

receiving values of each graph property of the selected subset of graph properties for each graph of the set of graphs, based on the received first user input;

generating a plot for each graph property based on the received values of a corresponding graph property;

receiving a second user input indicative of a sorting technique to sort the received values of each graph property of the selected subset of graph properties;

determining whether the sorting technique corresponds to an anchor-based sorting, based on the received second user input;

sorting the received values of each graph property based on received values of an anchor-graph property determined for each graph of the set of graphs, based on the determination that the sorting technique corresponds to the anchor-based sorting;

generating a first set of plots by updating the generated plot for each graph property based on the sorted received values of the corresponding graph property; and generating a second set of plots by updating the generated plot for each graph property, based on an independent sorting of values of the corresponding graph property for each graph of the set of graphs, based on the determination that the sorting technique does not correspond to the anchor-based sorting, wherein one of the first set of plots or the second set of plots corresponds to a one-dimensional graph view.

12. The method according to claim 11, wherein the one-dimensional graph view is indicative of a correlation between a first property and a second property, on a per-graph level.

13. The method according to claim 11, wherein the second set of plots corresponding to the one-dimensional graph view is indicative of a range and a distribution of a set of values of the determined set of attributes, on a global level.

14. A method, executed by a processor, comprising:

receiving a graph dataset including a set of graphs;

generating, by a task scheduler, a set of task queues configured to process the received graph dataset in parallel;

determining, by the set of task queues, a set of graph attributes for each graph of the set of graphs;

receiving, by a web service, one or more graph attributes of the determined set of graph attributes;

transmitting, by the web service, attribute information including the received one or more graph attributes to a client browser, wherein the client browser is configured to determine a set of graph views based on the transmitted attribute information; and controlling rendering of the determined set of graph views on the client browser, the method further comprising:

receiving a third user input indicative of a selection of a property of a set of properties associated with the determined set of attributes;

receiving values of the selected property for each graph of the set of graphs, based on the received third user input;

sorting the received values based on the selected property for each graph of the set of graphs;

receiving a fourth user input indicative of a selection of a value range for the selected property;

sampling a plurality of graphs from the set of graphs based on the value range for the selected property indicated in the received fourth user input;

receiving a first set of images associated with each graph of the sampled plurality of graphs;

receiving a fifth user input indicative of a plot type to represent the values of the selected property for each graph of the sampled plurality of graphs; and plotting the values of the selected property based on the plot type indicated in the received fifth user input and on the received images, wherein the plotted values of the selected property correspond to a graph set view.

15. The method according to claim 14, further comprising receiving a second set of images associated with graphs other than the sampled plurality of graphs from the set of graphs.

16. The method according to claim 15, further comprising controlling a storage of one or more of the received first set of images or the received second set of images in an image cache associated with the client browser.

17. The method according to claim 14, wherein the received first set of images associated with each graph of the sampled plurality of graphs corresponds to a representation of the corresponding graph in a layout including one of a spring layout, a spectral layout, a circular layout, or a shell layout.

18. One or more non-transitory computer-readable storage media configured to store instructions that, in response to being executed, cause an electronic device to perform operations, the operations comprising:

receiving a graph dataset including a set of graphs;

generating, by a task scheduler, a set of task queues configured to process the received graph dataset in parallel;

determining, by the set of task queues, a set of graph attributes for each graph of the set of graphs;

receiving, by a web service, one or more graph attributes of the determined set of graph attributes;

transmitting, by the web service, attribute information including the received one or more graph attributes to a client browser, wherein the client browser is configured to determine a set of graph views based on the transmitted attribute information; and controlling rendering of the determined set of graph views on the client browser, the operations further comprising:

determining, for each graph of the set of graphs, whether a corresponding graph is a continuous graph;

extracting a subgraph from each graph of the set of graphs, based on the determination that a corresponding graph is a continuous graph, for extraction of a set of subgraphs, wherein the set of task queues is generated based on the extracted set of subgraphs;

determining whether a first graph attribute of the set of graph attributes, is determined for each subgraph of the extracted set of subgraphs and each discrete graph of the set of graphs;

transmitting, by a first task queue of the set of tasks queues, a first notification, indicative of a completion of a determination of the first graph attribute, to the web service based on the determination that the first graph attribute is determined for each subgraph of the extracted set of subgraphs and each discrete graph of the set of graphs;

determining whether each graph attribute, of the set of graph attributes, is determined for each subgraph of the extracted set of subgraphs and each discrete graph of the set of graphs; and transmitting, by each task queue of the set of tasks queues, a second notification, indicative of a completion of a determination of the set of graph attributes, to the web service based on the determination that each graph attribute of the set of graph attributes is determined for each subgraph of the extracted set of subgraphs and each discrete graph of the set of graphs.

19. An electronic device, comprising:

a memory configured to store instructions; and a processor, coupled to the memory, configured to execute the instructions to perform a process comprising:

controlling rendering of an electronic user interface (UI) that comprises one or more UI elements corresponding to a set of graph views associated with a set of graphs on a client browser;

receiving, via the rendered electronic UI, a user input indicative of a selection of the set of graphs from a plurality of graphs;

receiving a graph dataset including the set of graphs;

generating, by a task scheduler, a set of task queues configured to process the received graph dataset in parallel;

determining, by the set of task queues, a set of graph attributes for each graph of the set of graphs;

receiving, by a web service, one or more graph attributes of the determined set of graph attributes; and transmitting, by the web service, attribute information including the received one or more graph attributes to the client browser, wherein the client browser is configured to determine the set of graph views based on the transmitted attribute information, the process further comprising:

determining, for each graph of the set of graphs, whether a corresponding graph is a continuous graph;

extracting a subgraph from each graph of the set of graphs, based on the determination that a corresponding graph is a continuous graph, for extraction of a set of subgraphs, wherein the set of task queues is generated based on the extracted set of subgraphs;

determining whether a first graph attribute of the set of graph attributes, is determined for each subgraph of the extracted set of subgraphs and each discrete graph of the set of graphs;

transmitting, by a first task queue of the set of tasks queues, a first notification, indicative of a completion of a determination of the first graph attribute, to the web service based on the determination that the first graph attribute is determined for each subgraph of the extracted set of subgraphs and each discrete graph of the set of graphs;

determining whether each graph attribute, of the set of graph attributes, is determined for each subgraph of the extracted set of subgraphs and each discrete graph of the set of graphs; and transmitting, by each task queue of the set of tasks queues, a second notification, indicative of a completion of a determination of the set of graph attributes, to the web service based on the determination that each graph attribute of the set of graph attributes is determined for each subgraph of the extracted set of subgraphs and each discrete graph of the set of graphs.

* * * * *